United States Patent
Hansen

(10) Patent No.: US 10,176,715 B2
(45) Date of Patent: Jan. 8, 2019

(54) NAVIGATION SYSTEM WITH DYNAMIC MAPPING MECHANISM AND METHOD OF OPERATION THEREOF

(71) Applicant: Telenav, Inc., Santa Clara, CA (US)

(72) Inventor: Karl C. Hansen, Concord, NH (US)

(73) Assignee: Telenav, Inc., Santa Clara, CA (US)

( * ) Notice: Subject to any disclaimer, the term of this patent is extended or adjusted under 35 U.S.C. 154(b) by 217 days.

(21) Appl. No.: 15/220,747

(22) Filed: Jul. 27, 2016

(65) Prior Publication Data
US 2018/0033300 A1 Feb. 1, 2018

(51) Int. Cl.
| | |
|---|---|
| *G08G 1/0968* | (2006.01) |
| *H04B 1/3822* | (2015.01) |
| *G08G 1/0965* | (2006.01) |
| *G01C 21/34* | (2006.01) |
| *H04W 4/04* | (2009.01) |
| *G01C 21/36* | (2006.01) |
| *G08G 1/01* | (2006.01) |
| *G08G 1/015* | (2006.01) |
| *G08G 1/017* | (2006.01) |
| *G08G 1/0962* | (2006.01) |

(Continued)

(52) U.S. Cl.
CPC ....... *G08G 1/0965* (2013.01); *G01C 21/3697* (2013.01); *G08G 1/015* (2013.01); *G08G 1/017* (2013.01); *G08G 1/0112* (2013.01); *G08G 1/0133* (2013.01); *G08G 1/0141* (2013.01); *G08G 1/0145* (2013.01); *G08G 1/0962* (2013.01); *G08G 1/096716* (2013.01); *G08G 1/096741* (2013.01); *G08G 1/096775* (2013.01); *G08G 1/096791* (2013.01); *G08G 1/096811* (2013.01); *G08G 1/096827* (2013.01); *G08G 1/096844* (2013.01); *G08G 1/162* (2013.01); *G08G 1/167* (2013.01); *H04B 1/3822* (2013.01); *H04W 4/046* (2013.01)

(58) Field of Classification Search
CPC .............. G08G 1/0968; G08G 1/0965; G08G 1/096827; G08G 1/162; G08G 1/0962; G08G 1/0145; G08G 1/096811; G08G 1/096775; G08G 1/0141; G08G 1/167; G08G 1/096741; G08G 1/015; G08G 1/096791; G08G 1/096844; G08G 1/0112; G08G 1/096716; G08G 1/017; G08G 1/0133; G01C 21/3492; G01C 21/3697; H04B 1/3822; H04W 4/046
USPC ......................................................... 701/117
See application file for complete search history.

(56) References Cited

U.S. PATENT DOCUMENTS

| | | | |
|---|---|---|---|
| 8,467,956 B2 | 6/2013 | Lee et al. | |
| 2015/0149019 A1* | 5/2015 | Pilutti | ...................... G08G 1/22 |
| | | | 701/23 |
| 2016/0357188 A1* | 12/2016 | Ansari | ................. G05D 1/0212 |

* cited by examiner

*Primary Examiner* — Brian P Sweeney
(74) *Attorney, Agent, or Firm* — Perspectives Law Group, Corp.

(57) ABSTRACT

A method of operation of a navigation system includes: identifying a first-device location for representing a smart vehicle; identifying a unintelligent-vehicle location associated with the first-device location, the unintelligent-vehicle location for representing an unintelligent vehicle; determining a smart vehicle data for representing the smart vehicle data from an environmental sensors of the smart vehicle; and generating with a vehicle control circuit, an area profile for the unintelligent-vehicle location, based on the smart vehicle data for representing geographic relationship between the unintelligent vehicle and the smart vehicle, a further vehicle, or a combination thereof.

20 Claims, 8 Drawing Sheets

(51) Int. Cl.
*G08G 1/0967* (2006.01)
*G08G 1/16* (2006.01)

NAVIGATION SYSTEM WITH DYNAMIC MAPPING MECHANISM AND METHOD OF OPERATION THEREOF

TECHNICAL FIELD

An embodiment of the present invention relates generally to a navigation system, and more particularly to a system with a dynamic mapping mechanism.

BACKGROUND ART

Modern consumer and industrial electronics, especially devices such as graphical computing systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is navigation functions for devices. However, in the midst of increase in information readily available to the user, utilizing externally sourced information to provide unintended features for users has yet been fully utilized.

Thus, a need still remains for a navigation system with a dynamic mapping mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a first-device location for representing a smart vehicle; identifying a unintelligent-vehicle location associated with the first device location, the unintelligent-vehicle location for representing an unintelligent vehicle; determining a smart vehicle data for representing the smart vehicle data from an environmental sensor of the smart vehicle; and generating with a control circuit an area profile for the unintelligent-vehicle location based on the smart vehicle data for representing geographic relationship between the unintelligent vehicle and the smart vehicle, a further vehicle, or a combination thereof.

An embodiment of the present invention provides a navigation system, including: a control circuit configured to: identify a first-device location for representing a smart vehicle; identifying a unintelligent-vehicle location associated with the first-device location, the unintelligent-vehicle location for representing an unintelligent vehicle; determining a smart vehicle data for representing the smart vehicle data from an environmental sensors of the smart vehicle; and generating an area profile for the unintelligent-vehicle location based on the smart vehicle data for representing geographic relationship between the unintelligent vehicle and the smart vehicle, a further vehicle, or a combination thereof; and a storage circuit, coupled to the control circuit, configured to store the area profile.

An embodiment of the present invention provides a non-transitory computer readable medium including instructions for a navigation system, including: identifying a first-device location for representing a smart vehicle; identifying a unintelligent-vehicle location associated with the first-device location, the unintelligent-vehicle location for representing an unintelligent vehicle; determining a smart vehicle data for representing the smart vehicle data from an environmental sensors of the smart vehicle; and generating an area profile for the unintelligent-vehicle location based on the smart vehicle data for representing geographic relationship between the unintelligent vehicle and the smart vehicle, a further vehicle, or a combination thereof.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
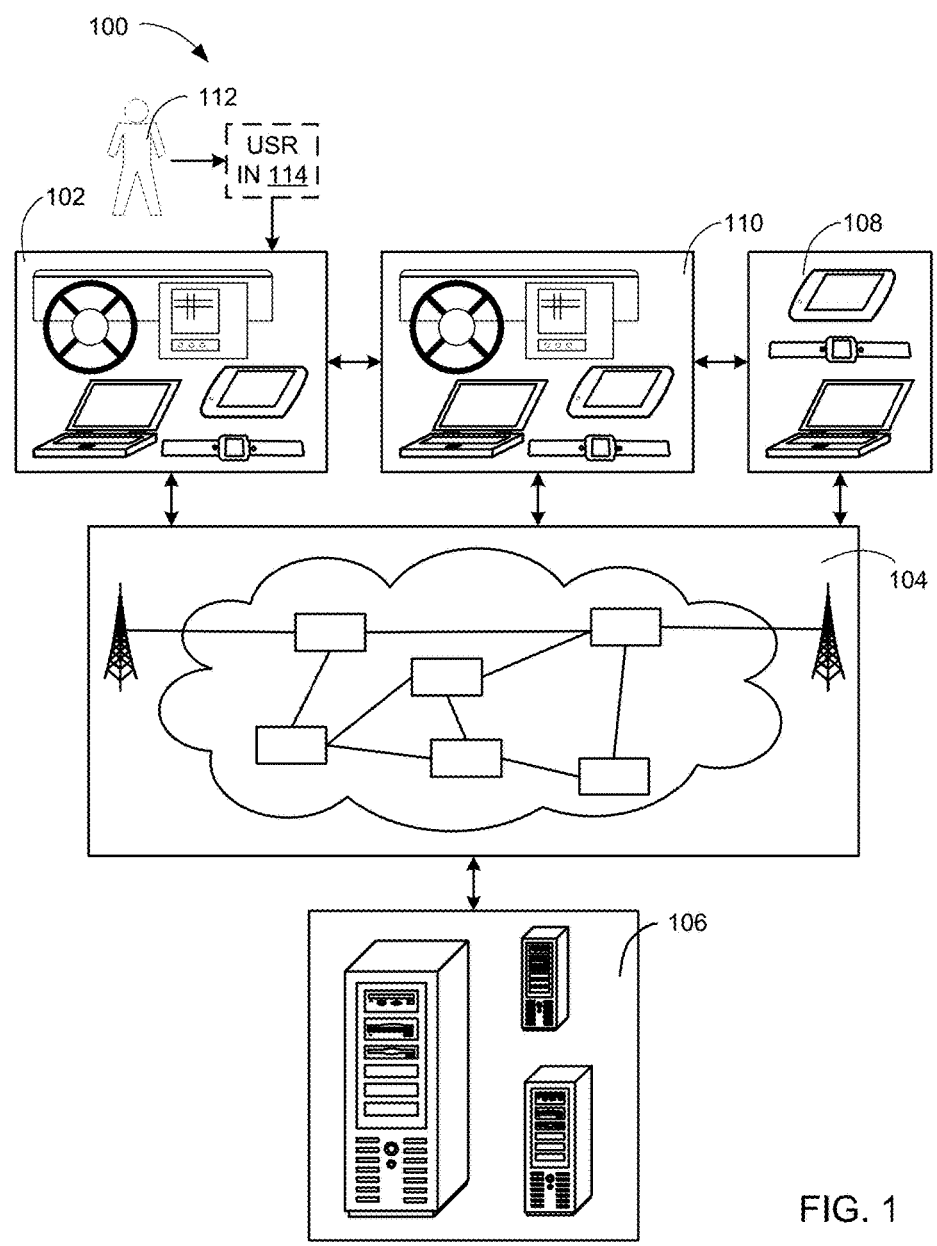
FIG. 1 is a navigation system with a dynamic mapping mechanism in an embodiment of the present invention.

The following embodiments can be a navigation system that can identify vehicles within a local area or zone within an entire navigation area. A single or multiple smart vehicles' smart sensors, road scheduling, traffic information, or a combination thereof can be used to identify vehicles. The information gathered can also be used to process notices, suggestions, warnings, direction regarding vehicle orientation, direction of travel, an alternative travel, or a combination thereof.

For example, the navigation system can identify the presence of all vehicles within an area of the entire map. As a result, this also identifies vehicles lacking any sensors or information that provide data of its presence. The information can be communicated to all the vehicles and any traffic or road authorities that can use the data.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits.

Referring now to FIG. 1, therein is shown a navigation system 100 with a dynamic mapping mechanism in an embodiment of the present invention. The navigation system 100 can include a first device 102, such as a client or a server, connected to a second device 106, such as a client or server.

The navigation system 100 can include a system for searching or providing guidance or information associated with geographic locations, a regulatory system for enabling access to a device or a vehicle, or a combination thereof. The first device 102 can communicate with the second device 106 with a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also for example, the first device 102 can include a device or a sub-system, an autonomous or self-maneuvering vehicle or object, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can further include a third device 108, a fourth device 110, or a combination thereof. The third device 108, the fourth device 110, or a combination thereof can be similar to the first device 102, the second device 106, or a combination thereof.

For example, the third device 108, the fourth device 110, or a combination thereof can include an end-user device, a mobile device, a server, a base station, a maneuverable vehicle or object, a portion thereof, or a combination thereof. Also for example, the third device 108, the fourth device 110, or a combination thereof can include device or subsystem included in or integral with a vehicle, such as a computing system, an infotainment system, or a combination thereof.

As a more specific example, the third device 108, the fourth device 110, or a combination thereof can include a cellular phone, personal digital assistant, a notebook computer, a wearable device, internet of things (IoT) device, automotive telematics navigation system, or other multi-functional mobile communication or entertainment device. Also as a more specific example, the third device 108, the fourth device 110, or a combination thereof can include a computer, grid computing resources, a virtualized computer resource, cloud computing resource, routers, switches, peer-to-peer distributed computing devices, or a combination thereof.

The navigation system 100 can be used by a user 112. The user 112 can include a person or an entity accessing or utilizing the navigation system 100 or a device therein. For example, the user 112 can include a person owning or operating the first device 102, the third device 108, the fourth device 110, a service, or a combination thereof. Also for example, the user 112 can access or utilize the second device 106 through the first device 102, the third device 108, the fourth device 110, a service, or a combination thereof.

The navigation system 100 can further process a direct user input 114 from the user 112. The direct user input 114 can include an input or a stimulus directly from or provided by the user 112. The direct user input 114 can be provided by or from the user 112 directly to or directly on the first device 102, the third device 108, or the fourth device 110. The direct user input 114 can include the input or the stimulus directly for or related to a corresponding software, application, feature, or a combination thereof.

The navigation system 100 can implement one or more embodiments, an inventive feature or embodiment, a portion therein, or a combination thereof without the direct user input 114. The navigation system 100 can further implement one or more embodiments, an inventive feature or embodiment, a portion therein, or a combination thereof using the direct user input 114 unrelated thereto, previous instances of the direct user input 114, or a combination thereof. Further details are discussed below.

Figure 2:
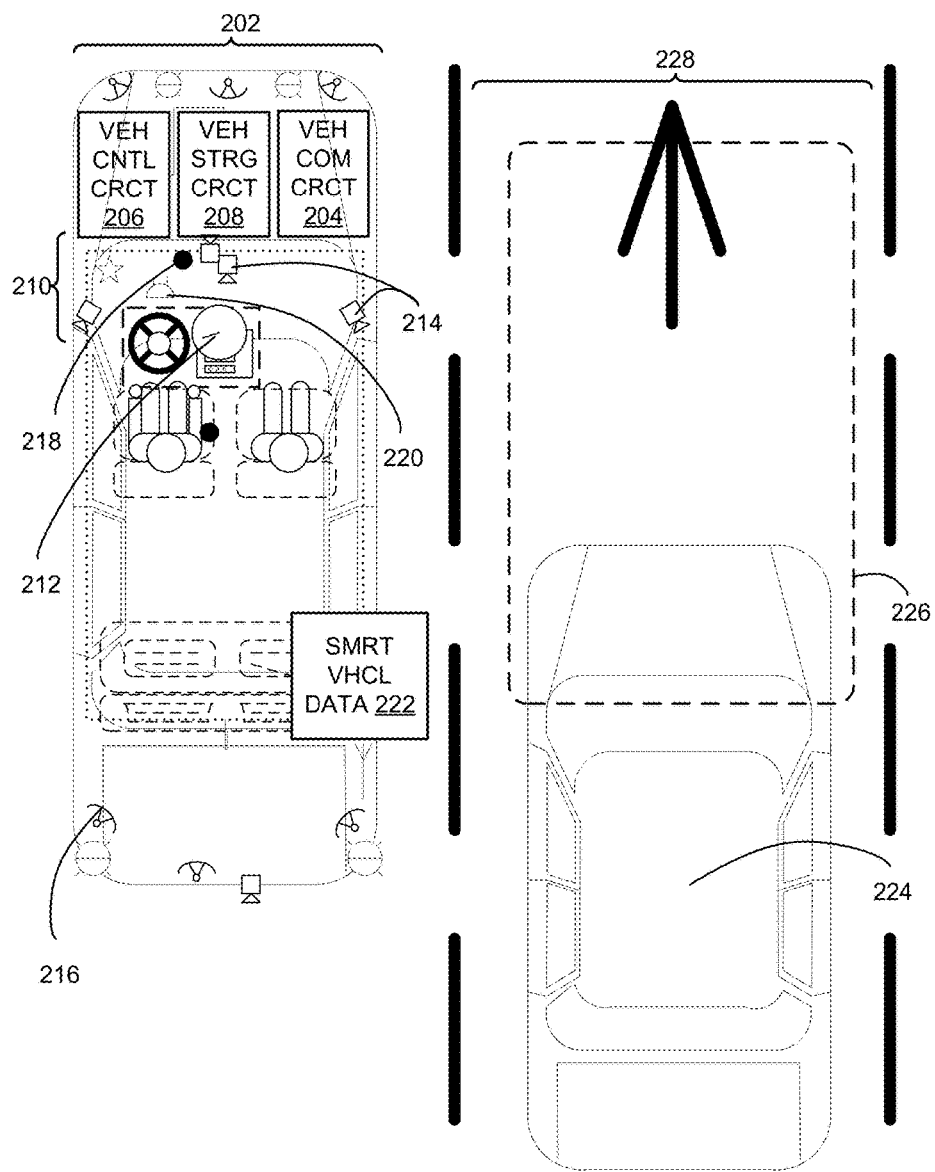
FIG. 2 is an example a top plan view illustration of various vehicles for the navigation system.

Referring now to FIG. 2, therein is shown an example a top plan view illustration of various vehicles for the navigation system 100 of FIG. 1. The navigation system 100 can include or interact with a smart vehicle 202 including one or more environmental sensors 210, an unintelligent vehicle 224, or a combination thereof.

The smart vehicle 202 is an object or a machine used for transporting people or goods capable of providing assistance in maneuvering or operating the object or the machine. The smart vehicle 202 can include vehicles accessible by the user 112 of FIG. 1 for control, maneuver, operation, or a combination thereof.

For example, the smart vehicle 202 can include a car, a truck, a cart, or a combination thereof. As a more specific example, the smart vehicle 202 can include a self-driving vehicle, or a vehicle with automatic maneuvering features, such as smart cruise control or preventative breaking.

The smart vehicle 202 can include a device, a circuit, one or more specific sensors, or a combination thereof for providing assistance or additional information to the user 112 controlling, maneuvering, or operating the smart vehicle 202. The smart vehicle 202 can include a vehicle communication circuit 204, a vehicle control circuit 206, a vehicle storage circuit 208, other interfaces, or a combination thereof.

The vehicle storage circuit 208 can include a functional unit or circuit integral to the smart vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof.

The vehicle control circuit 206 can include a function unit or circuit integral to the smart vehicle 202 and configured to execute or implement instructions. The vehicle control circuit 206 can execute or implement the vehicle software to provide the intelligence of smart vehicle 202, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the smart vehicle 202 and configured to enable external communication to and from the smart vehicle 202. For example, the vehicle communication circuit 204 can permit the smart vehicle 202 to communicate with the first device 102 of FIG. 1, the second device 106 of FIG. 1, the third device 108 of FIG. 1, the fourth device 110 of FIG. 1, the network 104 of FIG. 1, or a combination thereof.

The vehicle communication circuit 204 can also function as a communication hub allowing the smart vehicle 202 to function as part of the network 104 and not limited to be an end point or terminal circuit to the network 104. The vehicle communication circuit 204 can include active and passive components, such as microelectronics or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the first device 102, the second device 106, the third device 108, the fourth device 110, or a combination thereof as end points of the communication, such as for direct line-of-sight communication or peer-to-peer communication. The vehicle communication circuit 204 can further couple with the network 104 to send or receive information through a server or another intermediate device in between end points of the communication.

The smart vehicle 202 can further include various interfaces. The smart vehicle 202 can include one or more interfaces for interaction or internal communication between functional units or circuits of the smart vehicle 202. For example, the smart vehicle 202 can include one or more interfaces, such as drivers, firmware, wire connections or buses, protocols, or a combination thereof, for the vehicle storage circuit 208, the vehicle control circuit 206, or a combination thereof.

The smart vehicle 202 can further include one or more interfaces for interaction with an occupant, an operator or a driver, a passenger, or a combination thereof relative to the smart vehicle 202. For example, the smart vehicle 202 can include a user interface including input or output devices or circuits, such as a screen or touch screen, a speaker, a microphone, a keyboard or other input devices, an instrument panel, or a combination thereof.

The smart vehicle 202 can further include one or more interfaces along with switches or actuators for physically controlling movable components of the smart vehicle 202. For example, the smart vehicle 202 can include the one or more interfaces along with the controlling mechanisms to physically perform and control the maneuvering of the smart vehicle 202, such as for automatic driving or maneuvering features.

The functional units or circuits in the smart vehicle 202 can work individually and independently of the other functional units or circuits. The smart vehicle 202 can work individually and independently from the first device 102, the network 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the smart vehicle 202. The environmental sensors 210 can detect, identify, determine, or a combination thereof for the smart vehicle 202 itself, such as for status or movement thereof. The environmental sensors 210 can detect, identify, determine, or a combination thereof for environment within a cabin of the smart vehicle 202, an environment external to and surrounding the smart vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can include a sensor for identifying or calculating a geographic location of the smart vehicle 202, determining a movement of the smart vehicle 202, or a combination thereof. The location-movement sensor 212 can include an accelerometer, a speedometer, a GPS receiver or device, a gyroscope or a compass, or a combination thereof. The smart vehicle 202 can include the environmental sensors 210 other than or in addition to the location-movement sensor 212.

The visual sensor 214 can include a sensor for detecting or determining visual information representing the environment external to and surrounding the smart vehicle 202. The visual sensor 214 can include a camera attached to or integral with the smart vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 or another user device of the user 112 connected to and interacting with the smart vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the smart vehicle 202, a relative location or a distance between the object or the target and the smart vehicle 202, or a combination thereof.

The radar sensor 216 can utilize radio waves to determine or identify an existence of the object or the target, the relative location or a distance from the smart vehicle 202, or a combination thereof. For example, the radar sensor 216 can include a proximity sensor or warning system, such as for an area in front of, behind, adjacent to or on a side of, or a combination thereof geographically or physically relative to the smart vehicle 202.

The accessory sensor 218 can include a sensor for determining or detecting a status of a subsystem or a feature of the smart vehicle 202. The accessory sensor 218 can determine or detect the status or a setting for windshield wipers, turn signals, gear setting, headlights, or a combination thereof.

The volume sensor 220 can include a sensor for detecting or determining sounds for the smart vehicle 202. The volume sensor 220 can include a microphone for detecting or determining sounds within a cabin of the smart vehicle 202. The volume sensor 220 can further include a circuit for detecting or determining a volume level or an output level of speakers within the smart vehicle 202.

The smart vehicle 202 can use one or more of the environmental sensors 210 to generate smart vehicle data 222 describing or representing information regarding the environment within or surrounding the smart vehicle 202. The smart vehicle data 222 can be further processed with the vehicle control circuit 206, stored in the vehicle storage circuit 208, communicated to another device through the vehicle control circuit 206, or a combination thereof.

The smart vehicle 202 can further include a user device or a mobile device illustrated in FIG. 1. For example, the smart vehicle 202 can include the first device 102, the third device 108, the fourth device 110, or a combination thereof.

As a more specific example, the vehicle communication circuit 204, the vehicle control circuit 206, the vehicle storage circuit 208, the environmental sensors 210, one or more interfaces, or a combination thereof can be included in or make up the first device 102, the third device 108, the fourth device 110, or a combination thereof included in or integral with the smart vehicle 202. Also as a more specific example, the smart vehicle 202 can include or be integral with the first device 102, the third device 108, the fourth device 110, or a combination thereof including an embedded navigation system, an infotainment system, a smart driving or a driver assistance system, a self-driving or a maneuvering system for the vehicle, or a combination thereof.

The navigation system 100 can utilize the smart vehicle data 222 to dynamically determine and map a geographical area along with vehicles, pedestrians, objects, or a combination thereof within the geographical area. The navigation system 100 can further utilize the smart vehicle data 222 to provide information to the unintelligent vehicle 224.

The navigation system 100 can utilize the smart vehicle data 222 from the smart vehicle 202 to notify and assist an occupant or an operator of the unintelligent vehicle 224. The navigation system 100 can utilize the smart vehicle data 222 to provide the occupant or the operator of the unintelligent vehicle 224 with information regarding the unintelligent vehicle 224 or an environment thereof unavailable from the unintelligent vehicle 224. Details regarding the utilization and processing of the smart vehicle data 222 are discussed below.

The unintelligent vehicle 224 is an object or a machine used for transporting people or goods without enhanced assistance features for operating or maneuvering the object or the machine. The unintelligent vehicle 224 can be different from the smart vehicle 202. The unintelligent vehicle 224 can be absent of the environmental sensors 210 other than the location-movement sensor 212, can be incapable of generating the smart vehicle data 222, or sharing the smart vehicle data 222 with another device, or a combination thereof.

The unintelligent vehicle 224 can include vehicles produced or manufactured before the smart vehicle 202. The unintelligent vehicle 224 can include vehicles accessible by the user 112 for control, maneuver, operation, or a combination thereof.

For example, the unintelligent vehicle 224 can include a car, a truck, a cart, or a combination thereof. As a more specific example, the unintelligent vehicle 224 can include a manual vehicle, a vehicle with basic automatic maneuvering features, such as cruise control or speed regulating feature including a limiter or a warning system.

The unintelligent vehicle 224 can lack part of the smart vehicle's environmental sensors or all of the smart vehicle's environmental sensors 210. It can lack sensors that provide useful information about the vehicle's lane-change zone 226.

The lane-change zone 226 can include the location in close proximity to the vehicle. The lane-change zone 226 can include one or more traffic lane 228 next to the unintelligent vehicle 224, bike lane, street walk, pedestrian walkway, center divider, commercial zones, housing zones, industrial zones and a combination thereof. For example, the lane-change zone 226 can include an area to the right or the left of the vehicle, in front or behind the vehicle, a blind spot, or a combination thereof.

The traffic lane 228 can be a roadway designated for use by a single line of vehicles. The traffic lane 228 can include major highways, one-lane roads designated as one-way traffic, express lanes, parking lanes, auxiliary lanes, and dedicated lanes. The traffic lane 228 can also include a lane, such as a section or an area, for travel by one vehicle in a particular direction, such as on a highway or a road.

The navigation system 100 can use the smart vehicle data 222 to assist maneuvering of the unintelligent vehicle 224. The navigation system 100 can utilize the smart vehicle data 222 generated or provided by the smart vehicle 202 for maneuvering or notifying other relevant vehicles, including the unintelligent vehicle 224.

The navigation system 100 can communicate the smart vehicle data 222 between the first device 102, the second device 106, the third device 108, the fourth device 110, the network 104, the smart vehicle 202, or a combination thereof. For an illustrative example, the navigation system 100 can include the first device 102 within the smart vehicle 202, the third device 108 in the unintelligent vehicle 224, and the fourth device 110 in a separate vehicle, with the group of vehicles within a predetermined distance, relatively located according to a predetermined arrangement, or a combination thereof.

Continuing with the example, the navigation system 100 can use the smart vehicle data 222 generated or provided from the smart vehicle 202 without the user input 114 of FIG. 1 to provide information, assist maneuvering, control maneuvers, or a combination thereof for other vehicles, such as the unintelligent vehicle 224, the separate vehicle including the fourth device 110, another instance of the smart vehicle 202, or a combination thereof. The navigation system 100 can communicate the smart vehicle data 222 directly from the smart vehicle 202 or through the first device 102.

Continuing with the example, the navigation system 100 can communicate the smart vehicle data 222 through the second device 106 to other devices or vehicles, or directly communicate to the other devices or vehicles, such as for a peer-to-peer communication system. The navigation system 100 can communicate the smart vehicle data 222 for informing other devices or vehicles of the location or status of the smart vehicle 202 itself, about other vehicles detected and identified around the smart vehicle 202, or a combination thereof.

As a more specific example, the navigation system 100 can use the smart vehicle data 222 to provide a blind-spot warning, a real-time traffic status or movement ahead in the same instance of the traffic lane 228 or an adjacent instance of the traffic lane 228, or a combination thereof to another separate vehicle or a device, such as the third device 108 of the unintelligent vehicle 224. Also as a more specific example, the navigation system 100 can use the smart vehicle data 222 to provide real-time traffic status, locations or status of vehicles beyond the sensory area, automatic maneuvering information or commands, or a combination thereof to the fourth device 110 or another instance of the intelligent vehicle.

Also as a more specific example, the navigation system 100 can control a traffic flow for an area, such as for a traffic control center. The navigation system 100 can use the smart vehicle data 222 to control traffic lights, adjust routes for other vehicles according to real-time data, maneuver automatic or self-driving vehicles, route emergency vehicles, schedule trains or draw bridges, or a combination thereof.

Figure 3:
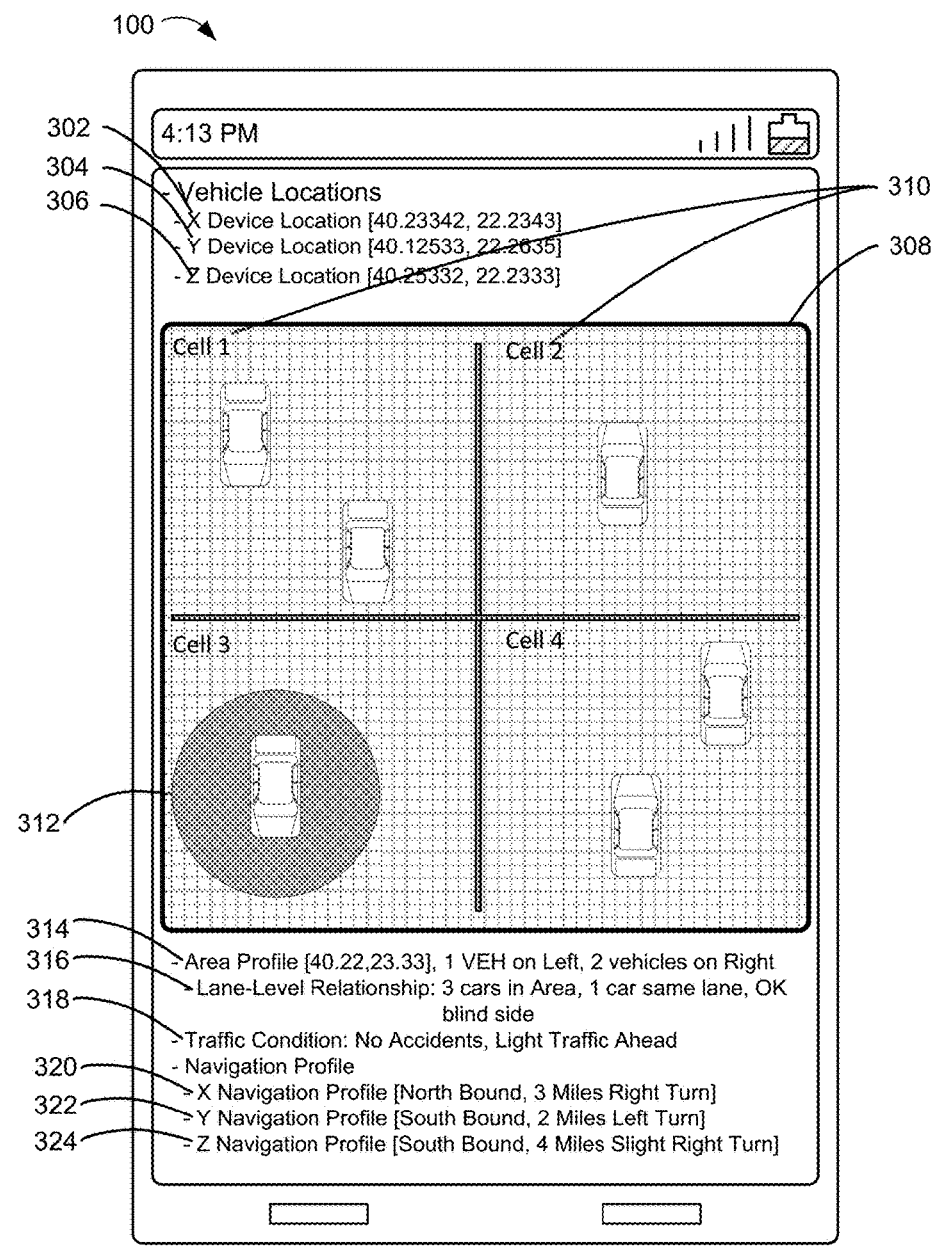
FIG. 3 is an example of the display interface of the navigation system.

Referring now to FIG. 3, therein is shown an example of a display interface of the navigation system 100. The navigation system 100 can include or process a location information for various devices or vehicles, such as a first-device location 302, a third-device location 304, a fourth-device location 306, or a combination thereof. The first-device location 302 can represent a geographic location of the first device 102 of FIG. 1. Continuing with the illustrative example, the first-device location 302 can further represent the geographic location of the smart vehicle 202 of FIG. 2. Similarly, the third-device location 304 can represent a geographic location of the third device 108 of FIG. 1 or the unintelligent vehicle 224 of FIG. 2, and the fourth-device location 306 can represent a geographic location of the fourth device 110 of FIG. 1 or the separate vehicle.

The navigation system 100 can further process or utilize a navigation map 308. The navigation map 308 can include a representation of geographic locations including the location of the smart vehicle 202, the unintelligent vehicle 224, or a combination thereof. The navigation map 308 can further include a map of the location of the first device 102, the third device 108, the fourth device 110, or a combination therefore.

The navigation map can further describe a local map of the area in close proximity to a particular area or neighborhood. For example, the navigation map 308 can be a plan, chart, diagram, survey, plat, plot, guide, atlas, or a globe of a particular area. The navigation map 308 can include a smart-sensor zone 312, one or more instances of a relevant vehicle area 310, an area profile 314, traffic condition 318, or a combination thereof.

The relevant vehicle area 310 is a subset of the navigation map 308 corresponding to the smart vehicle 202 or the first device 102 providing the smart vehicle data 222 of FIG. 2. The relevant vehicle area 310 can include a pre-designated "cell" or unit area for tracking the smart vehicle 202, an unintelligent vehicle 224, or a combination thereof.

The smart-sensor zone 312 can describe geographic areas relative to the smart vehicle 202 or the associated user device providing the smart vehicle data 222. The smart-sensor zone 312 can further include the geographic areas within sensing range of one or more of the environmental sensors 210 of FIG. 2.

The smart-sensor zone 312 can be used to provide information about one or more vehicles or objects therein, such as an identification of the one or more vehicles, a location of the one or more vehicles, a distance between the smart vehicle 202 and the one or more vehicles, a distance between multiple vehicles other than the smart vehicle 202, a status or a state of the one or more vehicles, or a combination thereof. The smart-sensor zone 312 can be used to process the distances from the smart vehicle 202 to another instance of the smart vehicle 202, the smart vehicle 202 to the unintelligent vehicle 224, or a combination thereof.

The smart-sensor zone 312 can further be used or processed to provide information about the orientations of the smart vehicle 202, the unintelligent vehicle 224, or a combination thereof. For example, the smart-sensor zone 312 can be used or processed to provide the direction or the heading of the smart vehicle 202 or the first device 102, other vehicles, or a combination thereof.

Also for example, the smart-sensor zone 312 can be used or processed to provide information that a vehicle is entering or exiting a particular "cell" or a unit area within the navigation map 308. The computing system 100 can include one or more cells or unit areas predetermined or predesignated to process and track multiple vehicles.

The smart-sensor zone 312 can be from the perspective of corresponding instance of the smart vehicle 202. The area profile 314 can be from the perspective of the second device 106 of FIG. 1 or the navigation map 308.

The area profile 314 can provide various information, including the location, regarding the smart vehicle 202, the unintelligent vehicle 224, or a combination thereof in a certain geographic location, such as within one cell or one-unit area of the navigation map 308. The area profile 314 can further provide details on a vehicle's movement, the smart vehicle data 222 from one or more of the smart vehicle 202 therein, the location of one or more of the unintelligent vehicle 224, or a combination thereof.

The area profile 314 can indicate the presence of the smart vehicle 202, the unintelligent vehicle 224, or a combination thereof within a corresponding area of the navigation map 308. The computing system 100 can process the area profile 314 based on the smart vehicle data 222 from the smart vehicle 202 located within the corresponding geographic area of the navigation map 308. The area profile 314 can further provide a lane-level relationship 316 of vehicles therein, such as the smart vehicle 202, the unintelligent vehicle 224, or a combination thereof.

The lane-level relationship 316 is a description of geographic relationship between vehicles relative to one or more instances of the traffic lane 228 of FIG. 2. The lane-level relationship 316 can describe relative positions of two or more vehicles. The lane-level relationship can describe relative positions of the smart vehicle 202 providing the smart vehicle data 222, the unintelligent vehicle 224, another instance of the smart vehicle 202, or a combination thereof.

The lane-level relationship 316 can include descriptions for vehicles traveling along the same instance or adjacent instances of the traffic lane 228. For example, the lane-level relationship 316 can describe one vehicle located or traveling in front or behind another vehicle based on direction of travel, located or traveling within a threshold distance from each other, adjacent to each other, one vehicle located or traveling in another vehicle's blind spot, or a combination thereof.

The lane-level relationship 316 can further include a quantity of cars as well as their description of travel relevant to each other. For example, the lane-level relationship 316 can represent the unintelligent vehicle 224 targeted by the process of the computing system 100 is the nth vehicle ahead or behind the other targeted device, such as the smart vehicle 202 providing the smart vehicle data 222, the unintelligent vehicle 224, another vehicle, or a combination thereof. For further illustrative example, the lane-level relationship 316 can include a description or an indication of the smart vehicle 202 traveling in the same direction of the unintelligent vehicle 224, traveling in the next lane of the smart vehicle 202 or an unintelligent vehicle 224, traveling in the opposite direction of the unintelligent vehicle 224 or the smart vehicle 202, or a combination of movements.

The traffic condition 318 provides information that will affect a state or a flow of traffic. Traffic condition 318 can significantly influence the actions of the smart vehicle 202, the unintelligent vehicle 224, the first device 102, the second device 106, the third device 108, the fourth device 110, and a combination thereof.

Traffic condition 318 can include a rate or a speed at which traffic flows in either direction. Traffic condition 318 can include traffic flow that is within a lane, outside a lane, across multiple lanes, or any direction a vehicle can travel. Traffic condition 318 can indicate an accident or an incident that can influence navigation in the navigation map 308.

Traffic condition 318 can further include weather information or weather advisory notifications. Traffic condition 318 can also include navigation obstructions, delays, or stoppage such as roadway closures, train crossings, bus stops, drawbridges, special events, or any combination thereof. Traffic condition 318 can change a first-device navigation profile 320, a third-device navigation profile 322, a fourth-device navigation profile 324, or a combination thereof.

The first-device navigation profile 320 is navigational or travel information about a device within the navigation system 100. For example, the first-device navigation profile 320 can including information regarding the smart vehicle 202, the first device 102, or a combination thereof.

Also for example, the first-device navigation profile 320 can include a route, a navigation session, a destination, or a combination thereof utilized or processed by the corresponding device. Also for example, the first-device navigation profile 320 can include the first-device location 302, the traffic lane 228 corresponding to the first-device location 302, a direction of travel on the road, upcoming maneuver or maneuvering instructions as estimated by the navigation system 100 or as known in the route, or a combination thereof.

The third-device navigation profile 322, the fourth-device navigation profile 324, or a combination thereof can be similar to the first-device navigation profile 320, but for a different device or vehicle. For example, the third-device navigation profile 322 can represent or correspond to the third device 108, the unintelligent vehicle 224, or a combination thereof.

Also for example, the fourth-device navigation profile 324 can correspond to the fourth device 110, a further vehicle, or a combination thereof. As a more specific example, the third-device navigation profile 322, the fourth-device navigation profile 324, or a combination thereof can include navigational information for the corresponding device, such as the unintelligent vehicle 224 or the third device 108 therein, the further vehicle or the fourth device 110 therein, or a combination thereof.

Figure 4:
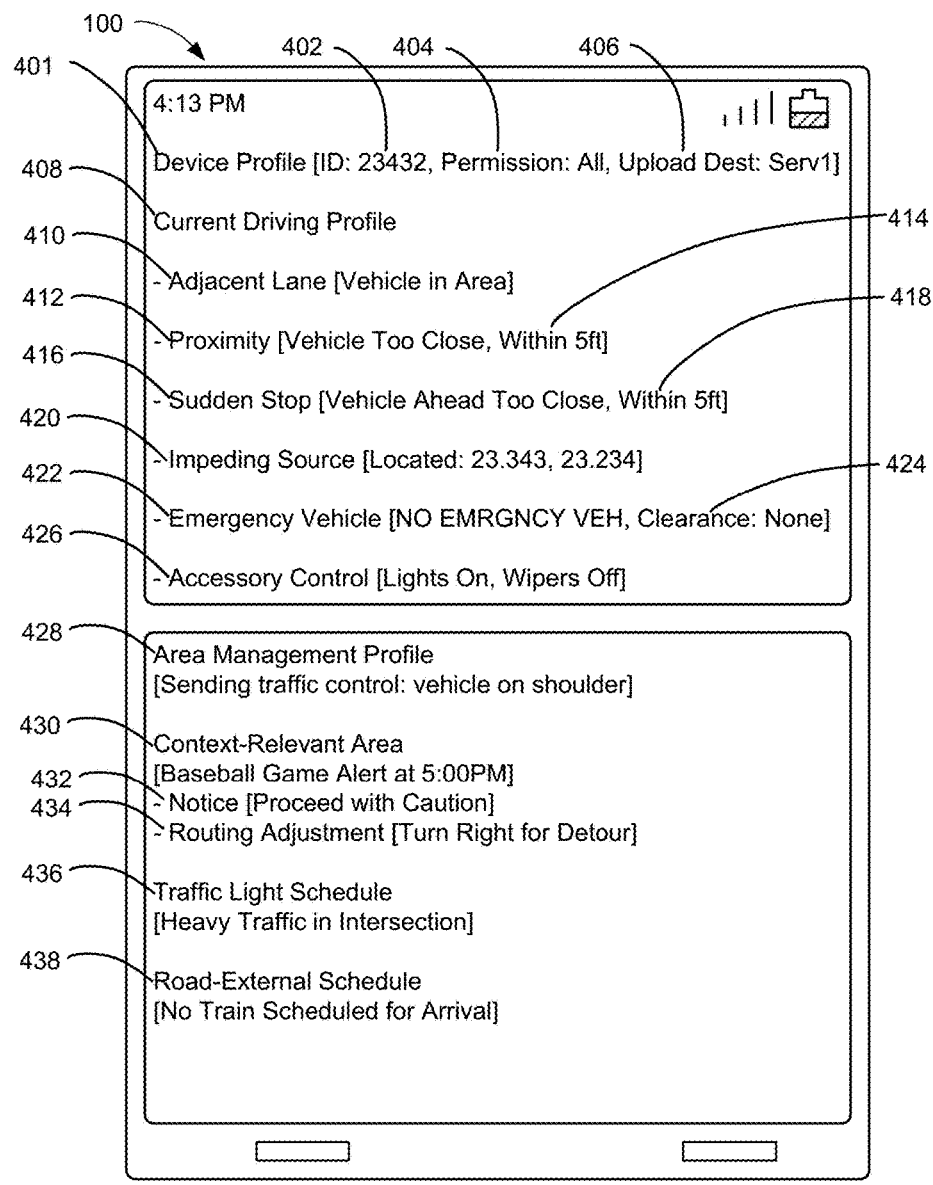
FIG. 4 is a further example of the display interface of the navigation system.

Referring now to FIG. 4, therein is shown a further example of a display interface of the navigation system 100. The navigation system 100 can further process or utilize a device profile 401. The device profile 401 identifies the vehicle's information and current status. The device profile 401 can correspond to the first device 102 of FIG. 1, the third device 108 of FIG. 1, the fourth device 110 of FIG. 1, or a combination thereof. The device profile 401 can further include information corresponding to the smart vehicle 202 of FIG. 2, the unintelligent vehicle 224 of FIG. 2, or a combination thereof.

The device profile 401 can further include a device identification 402, an access profile 404, an uploading designation 406, or a combination thereof. The device identification 402 provides information unique and specific to the device's identity.

For example, the device identification 402 can include a serial number, an account number, model number, phone number, manufacturer number, IP number, or a combination thereof. The device identification 402 can be utilized on the first device 102, the third device 108, the fourth device 110, or a combination thereof. The device identification 402 can further be utilized on the smart vehicle 202, the unintelligent vehicle 224, or a combination thereof.

The access profile 404 provides information about the level of security or permission given to a third device's access to the mesh or cloud. The access profile 404 can further allow a specific level of access. The access profile 404 can also be implemented on the third device 108, the unintelligent vehicle 224, or a combination thereof. For example, the unintelligent vehicle 224 can be given a limited access to other vehicle's smart vehicle data 222 of FIG. 2, which will allow for limited visibility to the surrounding areas. For further illustrative example, the access profile 404 for the third device 108 can be of the highest level, which will provide for the highest level of security and acquire access to the first device 102, the fourth device 110, or a combination thereof.

The uploading designation 406 provides information about a vehicle's role or communication destination for uploading progress or real-time information to the mesh or cloud. The uploading designation 406 can provide the upload progress or status of the first device 102, the second device 106 of FIG. 1, the third device 108, the fourth device 110, or a combination thereof. The uploading designation 406 can further provide the upload progress of the smart vehicle 202, the unintelligent vehicle 224, the server, the cloud, or a combination thereof.

The uploading designation 406 can gather smart vehicle data 222 from nearby smart vehicle 202, first device 102, fourth device 110, or a combination thereof. The uploading designation 406 can further act as a gateway or a router to other vehicles within close proximity amongst each other and upload the information for the grouping of vehicles to a server or a service provider. For example, the first device 102 can gather the fourth device 110 smart vehicle data 222 and upload all information to the third device 108.

The navigation system 100 can further process or utilize a current driving profile 408. The current driving profile 408 provides details about a vehicle's orientation, location, or movement relative to other vehicles. The current driving profile 408 can provide an alert or a warning for the first device 102, the third device 108, the fourth device, or a combination thereof. The current driving profile 408 can further provide details of a current traffic situation for the smart vehicle 202, the unintelligent vehicle 224, any other vehicles, or a combination thereof.

The current driving profile 408 can provide a variety of status such as an adjacent lane status 410, proximity status 412, a sudden stop status 416, or a combination thereof which provide details of the current orientation, location, or movement of vehicles. The current driving profile 408 can include information regarding an impeding source location 420, an emergency-vehicle notice 422, an accessory control 426, or a combination thereof.

The adjacent lane status 410 provides a notice or a status representing an existence or a presence of a vehicle within a particular zone in the navigation map 308 of FIG. 3. The adjacent lane status 410 can determine or represent whether a vehicle is in the lane-change zone 226 of FIG. 2 of a corresponding vehicle.

The adjacent lane status 410 can be utilized by the first device 102, the second device 106, the third device 108, the fourth device 110, or a combination thereof. The adjacent lane status 410 can further be utilized or processed by the smart vehicle 202, the unintelligent vehicle 224, a server, a cloud, or a combination thereof. The navigation system 100 can process the current driving profile 408 using the smart vehicle 202, the unintelligent vehicle 224, a vehicle corresponding to one or more of the devices for the navigation system 100, any other vehicle, or a combination thereof as a subject or a focus. The corresponding subject or the focus can be the receiver of the notices or can function as a reference point for the process.

For illustrative purposes, the adjacent lane status 410 can provide a notice to a user or a driver of the smart vehicle 202 that the unintelligent vehicle 224 has been spotted on a side of its lane-change zone 226. The navigation system 100 can determine the adjacent lane status 410 with the focus of the smart vehicle 202 when the unintelligent vehicle 224 is in the blind spot thereof or an adjacent instance of the traffic lane 228 of FIG. 2 relative to the smart vehicle 202. The navigation system 100 can further determine the adjacent lane status 410 of the unintelligent vehicle 224 relative thereto for the smart vehicle 202 or any other vehicle in the blind spot or adjacent lane of the unintelligent vehicle 224. The navigation system 100 can utilize the smart vehicle data 222 to determine the adjacent lane status 410 for the subject or the reference point of the unintelligent vehicle 224.

The proximity status 412 provides a warning or a representation that a vehicle's proximity has reached a particular distance or proximity threshold 414 to another vehicle. The proximity status 412 can be utilized by the first device 102, the second device 106, the third device 108, the fourth device 110, or a combination thereof. The proximity status 412 can further be use by the smart vehicle 202, the unintelligent vehicle 224, or a combination thereof. For example, the proximity status 412 can provide a warning that the unintelligent vehicle 224 or the smart vehicle 202 is following too close to another vehicle for providing a fair warning to possibly avoid a collision.

The proximity threshold 414 is a parameter or a limit in distance between two different vehicles. The proximity threshold 414 can include a limit distance associated with danger or potential collision. The proximity threshold 414 can include a distance in front, behind, next to or adjacent to, or a combination thereof relative to a reference vehicle. The proximity threshold 414 can be utilized by the first device 102, the second device 106, the third device 108, the fourth device 110, or a combination thereof. The proximity threshold 414 can further be use by the smart vehicle 202, the unintelligent vehicle 224, or a combination thereof.

The sudden stop status 416 provides notice or a representation that a vehicle has decelerated at or exceeding a specific rate. The sudden stop status 416 can include information relative to the reference vehicle, such as for a vehicle ahead or in front of the reference vehicle relative to a direction of travel of the reference vehicle.

The sudden stop status 416 can utilize a sudden stop threshold 418 to determine when to alert or provide warning that a vehicle has come to a sudden stop. The sudden stop threshold 418 is a quantitative parameter or a limit utilized to determine that a vehicle has come to a sudden stop. The sudden stop threshold 418 can include a deceleration rate, a force or a position of a brake pedal, a status or a magnitude associated with the braking system, or a combination thereof. The navigation system 100 can alert the reference vehicle that a separate vehicle ahead or near the reference vehicle has abruptly stopped and possibly affecting the reference vehicle based on the sudden stop status 416 and the sudden stop threshold 418.

The impeding source location 420 provides identification of geographic locations or corresponding vehicles associated with a traffic condition or status. The impeding source location 420 can include a location corresponding to a level of vehicle density, a specific flow rate, an accident or a stopped vehicle, or a combination thereof.

The impeding source location 420 can further include the geographic locations corresponding to slower or faster traffic flow in comparison to surrounding area, road segments, preceding or following road segment, or a combination thereof. The impeding source location 420 can be determined using the environmental sensors 210 of FIG. 2 and without the user input 114 of FIG. 1.

The emergency-vehicle notice 422 provides status or representation that an emergency vehicle is approaching or in the immediate vicinity. The emergency-vehicle notice 422 can inform recipient vehicles or devices of an accident or an emergency event for facilitating passage of the emergency vehicle passage by keeping a lane or an area clear. The emergency-vehicle notice 422 can further represent a location, a route, a travel direction, a relative distance, a status, or a combination thereof for an emergency vehicle, other type of vehicle responding or addressing an emergency, or a combination thereof.

For example, the emergency-vehicle notice 422 can be used to inform the user 112 of FIG. 1 of a police vehicle, a fire truck, a medical response vehicle, or a combination thereof approaching the user 112, following a route including the current location of the user 112, near or planning to travel near the user 112, or a combination thereof. Also for example, the emergency-vehicle notice 422 can be used to inform the user 112 of a personal or a non-emergency vehicle traveling in response to a verified emergency, such as for child births or emergency transport.

The emergency-vehicle notice 422 can be utilized by the first device 102, the second device 106, the third device 108, the fourth device 110, or a combination thereof. The emergency-vehicle notice 422 can further be applied in the smart vehicle 202, the unintelligent vehicle 224, or a combination thereof.

For illustrative purposes, the emergency-vehicle notice 422 can provide the unintelligent vehicle 224 warning to change lanes because an emergency vehicle is approaching. As a further example, the smart vehicle 202 can broadcast a message via the vehicle communication circuit 204 of FIG. 2 alerting other vehicles that an emergency vehicle is within proximity or a location thereof. The emergency-vehicle notice 422 can also provide direction. The emergency-vehicle notice 422 can be associated with an emergency-vehicle clearance control 424.

The emergency-vehicle clearance control 424 represents information associated with control or maneuver of a corresponding vehicle in association with the emergency-vehicle notice 422. The emergency-vehicle clearance control 424 can include a near-by target or designated location for maneuvering to avoid the approaching emergency vehicle. The emergency-vehicle clearance control 424 can represent a location where a vehicle can move in order to avoid or provide passage to an emergency vehicle.

The emergency-vehicle clearance control 424 can further provide notice or direction to an area which is calculated based on the traffic condition 318 of FIG. 3 or the navigation map 308 information. The emergency-vehicle clearance control 424 can further include control commands, maneuvering instructions, coordinates, component or device instructions, or a combination thereof for directly maneuvering a self-driving vehicle to avoid the approaching emergency vehicle or to clear a travel lane for the emergency vehicle. The emergency-vehicle clearance control 424 can be utilized by the first device 102, the third device 108, the fourth device 110, or a combination thereof. The emergency-vehicle clearance control 424 can further be applied in the smart vehicle 202, the unintelligent vehicle 224, or a combination thereof.

The accessory control 426 feature can provide automatic control signals for addressing environmental conditions. The accessory control 426 can be control signals in response to specific conditions such as weather, the amount of driving light, the traffic condition 318, or a combination thereof. There accessory control 426 can be utilized by the first device 102, the second device 106, the fourth device 110, or a combination thereof.

For example, the accessory control 426 can alert and automatically turn on lights of the smart vehicle 202 or a self-driving vehicle when the sunset time has passed, providing more light to see during dusk. Also for example, the accessory control 426 can include automatically activating or setting windshield wipers, internal cabin temperature, a communication level, such as for volume or brightness, or a combination thereof. The accessory control 426 can be based on information or data from another vehicle. The accessory control 426 can be implemented without the user input 114.

The navigation system 100 can further process an area management profile 428. The area management profile 428 is a set of information for managing traffic or vehicle flow within a geographic area corresponding to the area management profile 428. The area management profile 428 can be generated, calculated, provided, or a combination thereof by a service provider, a traffic control process, or a combination thereof. The area management profile 428 can be sent to, implemented by, or a combination thereof using the smart vehicle 202, the unintelligent vehicle 224, the first device 102, the third device 108, the fourth device 110, other vehicles, or a combination thereof.

The area management profile 428 can provide alerts or information within a specific area or zone in the navigation map 308. These alerts can consequently provide direction or information that can make adjustments to an actual schedule. The area management profile 428 can further provide notifications to the smart vehicle 202, the unintelligent vehicle 224, the first device 102, the third device 108, the fourth device 110, or a combination thereof.

As an illustrative example, the first device 102 can receive an alert via area management profile 428, which will provide fair warning that an event such as a ballgame will occur along the destination. The area management profile can also include a context-relevant area 430, traffic light schedule 436, and road-external schedule 438.

The context-relevant area 430 is a location that is triggering an affect or influence in an area or zone within the navigation map 308. The context-relevant area can be an event or an occurrence such a game, a rally, festival, parade, a random phenomenon, or a scheduled activity that can cause a change of plan, attitude, guidance, or behavior. The context-relevant area can include the impeding source location 420. The context-relevant area 430 can be utilized by the first device 102, the third device 108, the fourth device 110, or a combination thereof.

The context-relevant area 430 can also be use by the smart vehicle 202, the unintelligent vehicle 224, or a combination thereof. The context-relevant area 430 can also be associated with a context-relevant notice 432 and a routing adjustment 434.

The context-relevant notice 432 is the information provided to the user 112 regarding the context-relevant area 430. The context-relevant notice 432 can include a notice or an alert provided to the user 112 or a device or a vehicle associated thereto for the user 112 within a threshold distance from the context-relevant area 430, heading to or passing through an area within the threshold distance from the context-relevant area 430, or a combination thereof.

The context-relevant notice 432 can provide details and alerts about a given zone that can affect other users and vehicles when situated within the specific region. The context-relevant notice 432 can be utilized by the first device 102, the third device 108, the fourth device 110, or a combination thereof.

The context-relevant notice 432 can further be employed by the smart vehicle 202, the unintelligent vehicle 224, or a combination thereof. As an illustrative example, the smart vehicle 202 can be used to provide a notice that an impromptu boycott or rally is occurring within a navigated region in the navigation map 308, therefore other vehicles can avoid traversing through the same region.

The routing adjustment 434 is information for adjusting a planned route or direction. The routing adjustment 434 can be a suggestion or an automatic deviation from the original route. The routing adjustment 434 can be for avoiding the context-relevant area 430, the impeding source location 420, another area associated thereto, or a combination thereof.

The routing adjustment 434 can be processed or implemented with the first device 102, the second device 106, the third device 108, the fourth device 110, or a combination thereof. The routing adjustment 434 can further be processed or implemented with the smart vehicle 202, the unintelligent vehicle 224, or a combination thereof.

The navigation system 100 can further process the area management profile 428 include a traffic light schedule 436, a road-external schedule 438, or a combination thereof. The traffic light schedule 436 is information regarding control mechanisms for managing traffic signals. The traffic light schedule 436 can include a time, a frequency, a location, a condition or an event, a correlation or a relationship between various elements, or a combination thereof.

The traffic light schedule 436 can further provide information associated with the flow of traffic or vehicle moving during certain times of the day. The service provider, traffic controller, or a combination thereof can use the information from the user device, the vehicle, or a combination thereof to adjust or implement the traffic light schedule 436.

The road-external schedule 438 is information regarding timing of external influence affecting traffic flow. The road-external schedule 438 can include timing or schedule of influences external and unrelated to the road. These occurrences can be schedules that include relationships to draw bridges, trains, transit vehicles, boat traffic, air traffic control, or a combination thereof.

Figure 5:
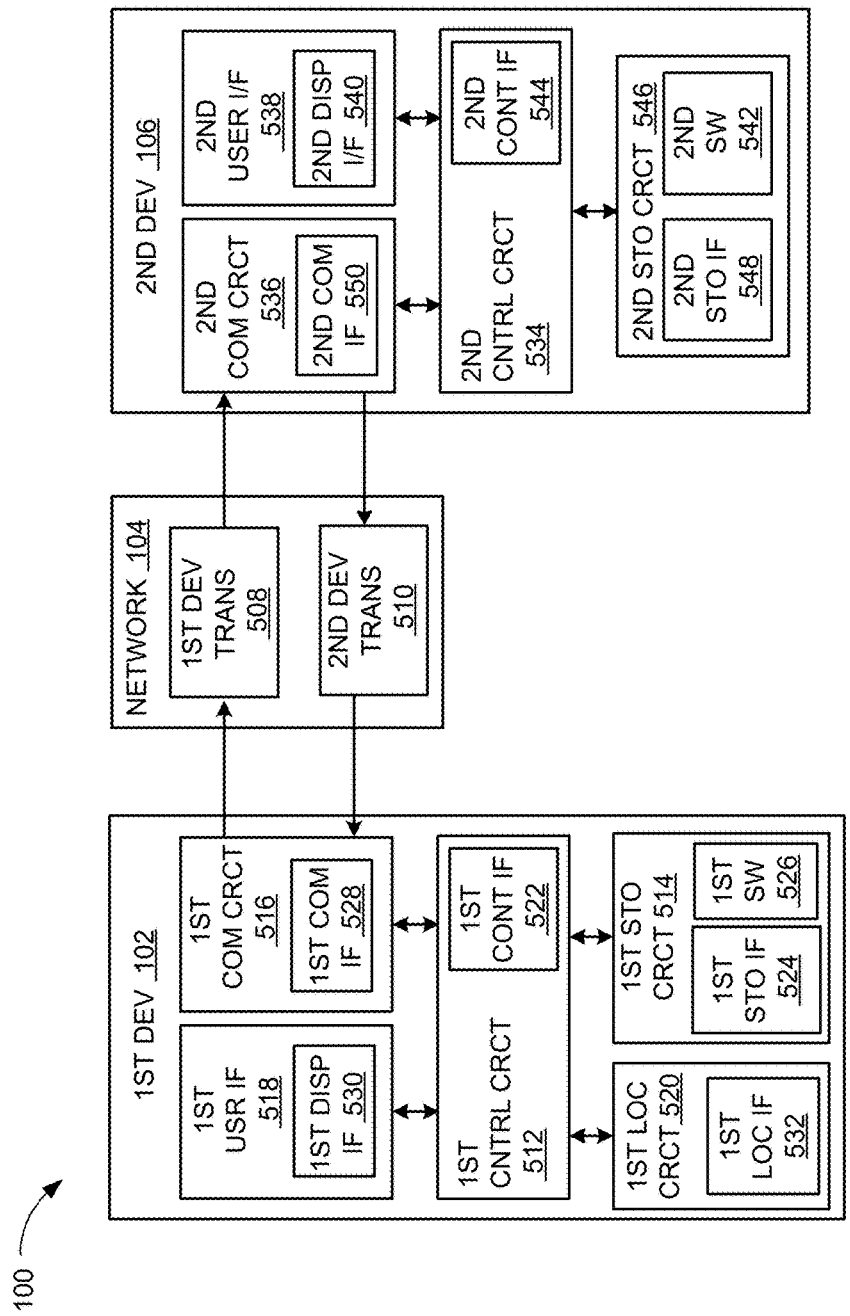
FIG. 5 is an exemplary block diagram of the navigation system.

Referring now to FIG. 5, therein is shown an exemplary block diagram of the navigation system 100. The navigation system 100 can include the first device 102 of FIG. 1, the network 104 of FIG. 1, and the second device 106 of FIG. 1. The first device 102 can send information in a first device transmission 508 of FIG. 5 over the network 104 to the second device 106. The second device 106 can send information in a second device transmission 510 of FIG. 5 over the network 104 to the first device 102.

For illustrative purposes, the navigation system 100 is shown with the first device 102 as a client device, although it is understood that the navigation system 100 can include the first device 102 as a different type of device. For example, the first device 102 can be a server containing a display interface.

Also for illustrative purposes, the navigation system 100 is shown with the second device 106 as a server, although it is understood that the navigation system 100 can include the second device 106 as a different type of device. For example, the second device 106 can be a client device.

Also for illustrative purposes, the navigation system 100 is shown with interaction between the first device 102 and the second device 106. However, it is understood that the first device 102 can similarly interact with the third device 108 of FIG. 1, the fourth device 110 of FIG. 1, or a combination thereof. Similarly, the second device 106 can similarly interact with the third device 108, the fourth device 110, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 512 of FIG. 5, a first storage circuit 514 of FIG. 5, a first communication circuit 516 of FIG. 5, and a first user interface 518 of FIG. 5, and a first location circuit 520 of FIG. 5. The first control circuit 512 can include a first control interface 522 of FIG. 5. The first control circuit 512 can execute a first software 526 of FIG. 5 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524 of FIG. 5. The first storage interface 524 can be used for communication between the first storage circuit 514 and other functional units or circuits in the first device 102. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106 of FIG. 1, an attachment, such as a peripheral device or a desktop computer, and the network 104.

The first communication circuit 516 can also function as a communication hub allowing the first device 102 to function as part of the network 104 and not limited to be an end point or terminal circuit to the network 104. The first communication circuit 516 can include active and passive components, such as microelectronics or an antenna, for interaction with the network 104.

The first communication circuit 516 can include a first communication interface 528 of FIG. 5. The first communication interface 528 can be used for communication between the first communication circuit 516 and other functional units or circuits in the first device 102. The first communication interface 528 can receive information from the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530 of FIG. 5. The first display interface 530 can include an output device. The first display interface 530 can include a display, a projector, a video screen, a speaker, or any combination thereof.

The first control circuit 512 can operate the first user interface 518 to display information generated by the navigation system 100. The first control circuit 512 can also execute the first software 526 for the other functions of the navigation system 100, including receiving location information from the first location circuit 520. The first control circuit 512 can further execute the first software 526 for interaction with the network 104 via the first communication circuit 516.

The first location circuit 520 can generate location information, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver.

The first location circuit 520 can include a first location interface 532 of FIG. 5. The first location interface 532 can be used for communication between the first location circuit 520 and other functional units or circuits in the first device 102. The first location interface 532 can also be used for communication external to the first device 102.

The first location interface 532 can receive information from the other functional units/circuits or from external sources, or can transmit information to the other functional units/circuits or to external destinations. The external sources and the external destinations refer to sources and destinations external to the first device 102.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534 of FIG. 5, a second communication circuit 536 of FIG. 5, a second user interface 538 of FIG. 5, and a second storage circuit 546 of FIG. 5.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540 of FIG. 5. The second display interface 540 can include a display, a projector, a video screen, a speaker, or any combination thereof.

The second control circuit 534 can execute a second software 542 of FIG. 5 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544 of FIG. 5. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548 of FIG. 5. The second storage interface 548 can be used for communication between the second storage circuit 546 and other functional units or circuits in the second device 106. The second storage interface 548 can also be used for communication that is external to the second device 106.

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104.

The second communication circuit 536 can also function as a communication hub allowing the second device 106 to function as part of the network 104 and not limited to be an end point or terminal unit or circuit to the network 104. The second communication circuit 536 can include active and passive components, such as microelectronics or an antenna, for interaction with the network 104.

The second communication circuit 536 can include a second communication interface 550 of FIG. 5. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The first communication circuit 516 can couple with the network 104 to send information to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 6:
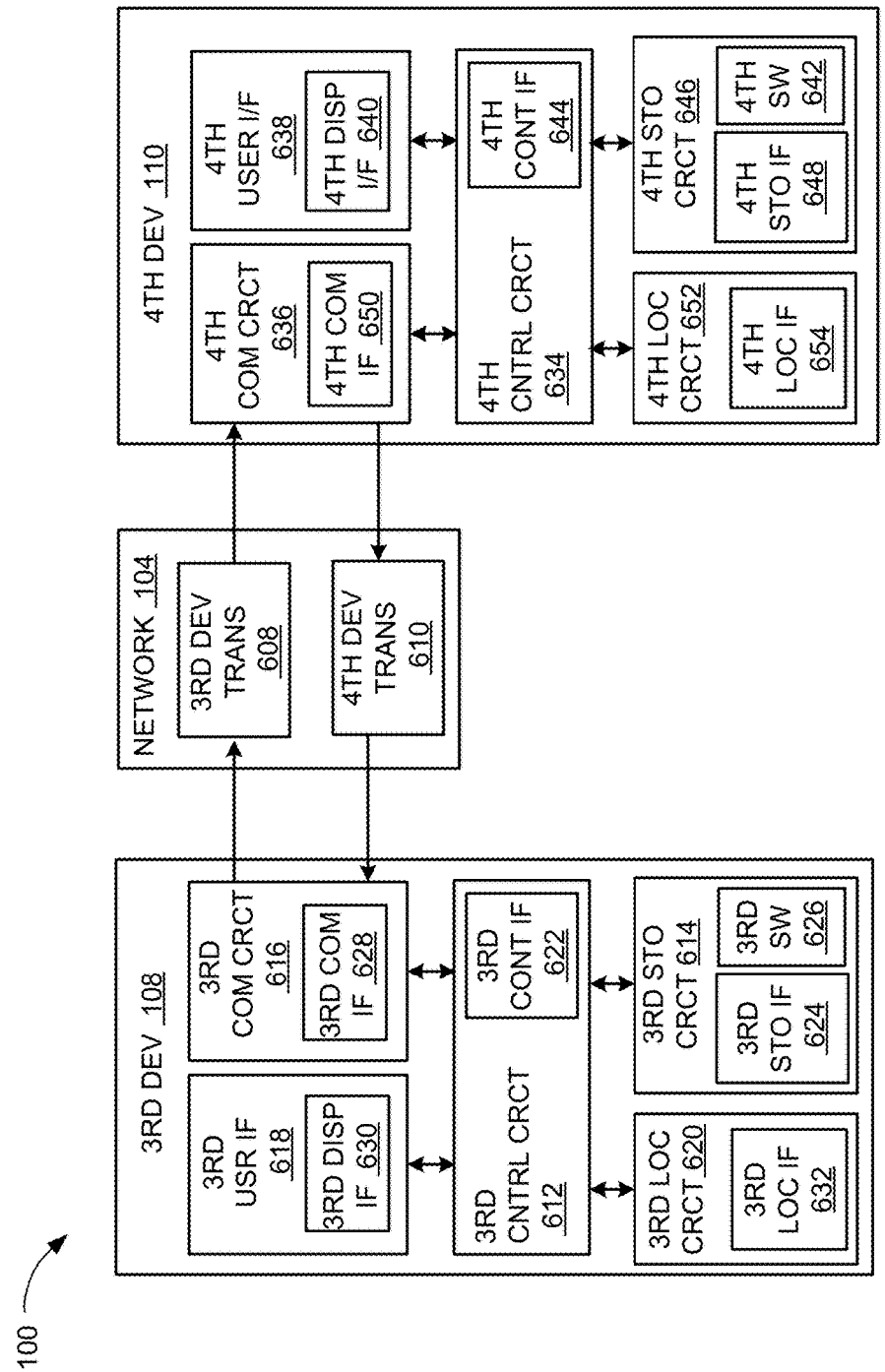
FIG. 6 is a further exemplary block diagram of the navigation system.

Referring now to FIG. 6, therein is shown an exemplary block diagram of the navigation system 100. The navigation system 100 can include the third device 108 of FIG. 1, the network 104 of FIG. 1, and the fourth device 110 of FIG. 1. The third device 108 can send information in a third device transmission 608 of FIG. 6 over the network 104 to the fourth device 110. The fourth device 110 can send information in a fourth device transmission 610 of FIG. 6 over the network 104 to the third device 108.

For illustrative purposes, the navigation system 100 is shown with the third device 108 and the fourth device 110 as client devices, although it is understood that the navigation system 100 can include the third device 108, the fourth device 110, or a combination thereof as a different type of device. For example, the third device 108 can be a server containing a display interface.

Also for illustrative purposes, the navigation system 100 is shown with interaction between the third device 108 and the fourth device 110. However, it is understood that the third device 108 can similarly interact with the first device 102 of FIG. 1, the second device 106 of FIG. 1, or a combination thereof. Similarly, the fourth device 110 can similarly interact with the first device 102, the second device 106, or a combination thereof.

For brevity of description in this embodiment of the present invention, the third device 108 and the fourth device 110 will be described as a client device. The embodiment of the present invention is not limited to this selection for the type of devices. The selection is an example of an embodiment of the present invention.

The third device 108 can include a third control circuit 612 of FIG. 6, a third storage circuit 614 of FIG. 6, a third communication circuit 616 of FIG. 6, and a third user interface 618 of FIG. 6, and a third location circuit 620 of FIG. 6. The third control circuit 612 can include a third control interface 622 of FIG. 6. The third control circuit 612 can execute a third software 626 of FIG. 6 to provide the intelligence of the navigation system 100.

The third control circuit 612 can be implemented in a number of different manners. For example, the third control circuit 612 can be a processor, an application specific integrated circuit (ASIC) an embedded processor, a microprocessor, a hardware control logic, a hardware finite state machine (FSM), a digital signal processor (DSP), or a combination thereof. The third control interface 622 can be used for communication between the third control circuit 612 and other functional units or circuits in the third device 108. The third control interface 622 can also be used for communication that is external to the third device 108.

The third control interface 622 can receive information from the other functional units/circuits or from external sources, or can transmit information to the other functional units/circuits or to external destinations. The external sources and the external destinations refer to sources and destinations external to the third device 108.

The third control interface 622 can be implemented in different ways and can include different implementations depending on which functional units/circuits or external units/circuits are being interfaced with the third control interface 622. For example, the third control interface 622 can be implemented with a pressure sensor, an inertial sensor, a microelectromechanical system (MEMS), optical circuitry, waveguides, wireless circuitry, wireline circuitry, or a combination thereof.

The third storage circuit 614 can store the third software 626. The third storage circuit 614 can also store the relevant information, such as data representing incoming images, data representing previously presented image, sound files, or a combination thereof.

The third storage circuit 614 can be a volatile memory, a nonvolatile memory, an internal memory, an external memory, or a combination thereof. For example, the third storage circuit 614 can be a nonvolatile storage such as non-volatile random access memory (NVRAM), Flash memory, disk storage, or a volatile storage such as static random access memory (SRAM).

The third storage circuit 614 can include a third storage interface 624 of FIG. 6. The third storage interface 624 can be used for communication between the third storage circuit 614 and other functional units or circuits in the third device 108. The third storage interface 624 can also be used for communication that is external to the third device 108.

The third storage interface 624 can receive information from the other functional units/circuits or from external sources, or can transmit information to the other functional units/circuits or to external destinations. The external sources and the external destinations refer to sources and destinations external to the third device 108.

The third storage interface 624 can include different implementations depending on which functional units/circuits or external units/circuits are being interfaced with the third storage circuit 614. The third storage interface 624 can be implemented with technologies and techniques similar to the implementation of the third control interface 622.

The third communication circuit 616 can enable external communication to and from the third device 108. For example, the third communication circuit 616 can permit the third device 108 to communicate with the fourth device 110 of FIG. 1, an attachment, such as a peripheral device or a desktop computer, and the network 104.

The third communication circuit 616 can also function as a communication hub allowing the third device 108 to function as part of the network 104 and not limited to be an end point or terminal circuit to the network 104. The third communication circuit 616 can include active and passive components, such as microelectronics or an antenna, for interaction with the network 104.

The third communication circuit 616 can include a third communication interface 628 of FIG. 6. The third communication interface 628 can be used for communication between the third communication circuit 616 and other functional units or circuits in the third device 108. The third communication interface 628 can receive information from the other functional units/circuits or can transmit information to the other functional units or circuits.

The third communication interface 628 can include different implementations depending on which functional units or circuits are being interfaced with the third communication circuit 616. The third communication interface 628 can be implemented with technologies and techniques similar to the implementation of the third control interface 622.

The third user interface 618 allows a user (not shown) to interface and interact with the third device 108. The third user interface 618 can include an input device and an output device. Examples of the input device of the third user interface 618 can include a keypad, a touchpad, soft-keys, a keyboard, a microphone, an infrared sensor for receiving remote signals, or any combination thereof to provide data and communication inputs.

The third user interface 618 can include a third display interface 630 of FIG. 6. The third display interface 630 can include an output device. The third display interface 630 can include a display, a projector, a video screen, a speaker, or any combination thereof.

The third control circuit 612 can operate the third user interface 618 to display information generated by the navigation system 100. The third control circuit 612 can also execute the third software 626 for the other functions of the navigation system 100, including receiving location information from the third location circuit 620. The third control circuit 612 can further execute the third software 626 for interaction with the network 104 via the third communication circuit 616.

The third location circuit 620 can generate location information, current heading, current acceleration, and current speed of the third device 108, as examples. The third location circuit 620 can be implemented in many ways. For example, the third location circuit 620 can function as at least a part of the global positioning system, an inertial navigation system, a cellular-tower location system, a pressure location system, or any combination thereof. Also, for example, the third location circuit 620 can utilize components such as an accelerometer or global positioning system (GPS) receiver.

The third location circuit 620 can include a third location interface 632 of FIG. 6. The third location interface 632 can be used for communication between the third location circuit 620 and other functional units or circuits in the third device 108. The third location interface 632 can also be used for communication external to the third device 108.

The third location interface 632 can receive information from the other functional units/circuits or from external sources, or can transmit information to the other functional units/circuits or to external destinations. The external sources and the external destinations refer to sources and destinations external to the third device 108.

The third location interface 632 can include different implementations depending on which functional units/circuits or external units/circuits are being interfaced with the third location circuit 620. The third location interface 632 can be implemented with technologies and techniques similar to the implementation of the third control circuit 612.

The fourth device 110 can include a fourth control circuit 634 of FIG. 6, a fourth communication circuit 636 of FIG. 6, a fourth user interface 638 of FIG. 6, and a fourth storage circuit 646 of FIG. 6. The fourth control circuit 634 can execute a fourth software 642 of FIG. 6 to provide the intelligence of the navigation system 100.

The fourth user interface 638 allows a user (not shown) to interface and interact with the fourth device 110. The fourth user interface 638 can include an input device and an output device. Examples of the input device of the fourth user interface 638 can include a keypad, a touchpad, soft-keys, a keyboard, a microphone, or any combination thereof to provide data and communication inputs. Examples of the output device of the fourth user interface 638 can include a fourth display interface 640 of FIG. 6. The fourth display interface 640 can include a display, a projector, a video screen, a speaker, or any combination thereof.

The fourth control circuit 634 can operate the fourth user interface 638 to display information. The fourth control circuit 634 can also execute the fourth software 642 for the other functions of the navigation system 100, including operating the fourth communication circuit 636 to communicate with the third device 108 over the network 104. The fourth software 642 can operate in conjunction with the third software 626, the first software 526 of FIG. 5, the second software 542 of FIG. 5, or a combination thereof.

The fourth control circuit 634 can be implemented in a number of different manners. For example, the fourth control circuit 634 can be a processor, an embedded processor, a microprocessor, hardware control logic, a hardware finite state machine (FSM), a digital signal processor (DSP), or a combination thereof.

The fourth control circuit 634 can include a fourth control interface 644 of FIG. 6. The fourth control interface 644 can be used for communication between the fourth control circuit 634 and other functional units or circuits in the fourth device 110. The fourth control interface 644 can also be used for communication that is external to the fourth device 110.

The fourth control interface 644 can receive information from the other functional units/circuits or from external sources, or can transmit information to the other functional units/circuits or to external destinations. The external sources and the external destinations refer to sources and destinations external to the fourth device 110.

The fourth control interface 644 can be implemented in different ways and can include different implementations depending on which functional units/circuits or external units/circuits are being interfaced with the fourth control interface 644. For example, the fourth control interface 644 can be implemented with a pressure sensor, an inertial sensor, a microelectromechanical system (MEMS), optical circuitry, waveguides, wireless circuitry, wireline circuitry, or a combination thereof.

A fourth storage circuit 646 can store the fourth software 642. The fourth storage circuit 646 can also store the information such as data representing incoming images, data representing previously presented image, sound files, or a combination thereof.

For illustrative purposes, the fourth storage circuit 646 is shown as a single element, although it is understood that the fourth storage circuit 646 can be a distribution of storage elements. Also for illustrative purposes, the navigation system 100 is shown with the fourth storage circuit 646 as a single hierarchy storage system, although it is understood that the navigation system 100 can include the fourth storage circuit 646 in a different configuration. For example, the fourth storage circuit 646 can be formed with different storage technologies forming a memory hierarchal system including different levels of caching, main memory, rotating media, or off-line storage.

The fourth storage circuit 646 can be a volatile memory, a nonvolatile memory, an internal memory, an external memory, or a combination thereof. For example, the fourth storage circuit 646 can be a nonvolatile storage such as non-volatile random access memory (NVRAM), Flash memory, disk storage, or a volatile storage such as static random access memory (SRAM).

The fourth storage circuit 646 can include a fourth storage interface 648 of FIG. 6. The fourth storage interface 648 can be used for communication between the fourth storage circuit 646 and other functional units or circuits in the fourth device 110. The fourth storage interface 648 can also be used for communication that is external to the fourth device 110.

The fourth storage interface 648 can receive information from the other functional units/circuits or from external sources, or can transmit information to the other functional units/circuits or to external destinations. The external sources and the external destinations refer to sources and destinations external to the fourth device 110.

The fourth storage interface 648 can include different implementations depending on which functional units/circuits or external units/circuits are being interfaced with the fourth storage circuit 646. The fourth storage interface 648 can be implemented with technologies and techniques similar to the implementation of the fourth control interface 644.

The fourth communication circuit 636 can enable external communication to and from the fourth device 110. For example, the fourth communication circuit 636 can permit the fourth device 110 to communicate with the third device 108 over the network 104.

The fourth communication circuit 636 can also function as a communication hub allowing the fourth device 110 to function as part of the network 104 and not limited to be an end point or terminal unit or circuit to the network 104. The fourth communication circuit 636 can include active and passive components, such as microelectronics or an antenna, for interaction with the network 104.

The fourth communication circuit 636 can include a fourth communication interface 650 of FIG. 6. The fourth communication interface 650 can be used for communication between the fourth communication circuit 636 and other functional units or circuits in the fourth device 110. The fourth communication interface 650 can receive information from the other functional units/circuits or can transmit information to the other functional units or circuits.

The fourth communication interface 650 can include different implementations depending on which functional units or circuits are being interfaced with the fourth communication circuit 636. The fourth communication interface 650 can be implemented with technologies and techniques similar to the implementation of the fourth control interface 644.

The third communication circuit 616 can couple with the network 104 to send information to the fourth device 110 in the third device transmission 608. The fourth device 110 can receive information in the fourth communication circuit 636 from the third device transmission 608 of the network 104.

The fourth communication circuit 636 can couple with the network 104 to send information to the third device 108 in the fourth device transmission 610. The third device 108 can receive information in the third communication circuit 616 from the fourth device transmission 610 of the network 104. The navigation system 100 can be executed by the third control circuit 612, the fourth control circuit 634, or a combination thereof.

The first location circuit 520 of FIG. 5 can generate location information, current heading, current acceleration, and current speed of the first device 102, as examples. The first location circuit 520 can be implemented in many ways. For example, the first location circuit 520 can function as at least a part of the global positioning system, an inertial navigation system, a cellular-tower location system, a pressure location system, or any combination thereof. Also, for example, the first location circuit 520 can utilize components such as an accelerometer or global positioning system (GPS) receiver.

The fourth location circuit 652 of FIG. 6 can include a fourth location interface 654 of FIG. 6. The fourth location interface 654 can be used for communication between the fourth location circuit 652 and other functional units or circuits in the first device 102. The fourth location interface 654 can also be used for communication external to the first device 102.

The fourth location interface 654 can receive information from the other functional units/circuits or from external sources, or can transmit information to the other functional units/circuits or to external destinations. The external sources and the external destinations refer to sources and destinations external to the first device 102.

The fourth location interface 654 can include different implementations depending on which functional units/circuits or external units/circuits are being interfaced with the fourth location circuit 652. The fourth location interface 654 can be implemented with technologies and techniques similar to the implementation of the first control circuit 512 of FIG. 5.

For illustrative purposes, the fourth device 110 is shown with the partition containing the fourth user interface 638, the fourth storage circuit 646, the fourth control circuit 634, and the fourth communication circuit 636, although it is understood that the fourth device 110 can include a different partition. For example, the fourth software 642 can be partitioned differently such that some or all of its function can be in the fourth control circuit 634 and the fourth communication circuit 636. Also, the fourth device 110 can include other functional units or circuits not shown in FIG. 6 for clarity.

The functional units or circuits in the third device 108 can work individually and independently of the other functional units or circuits. The third device 108 can work individually and independently from the fourth device 110 and the network 104.

The functional units or circuits in the fourth device 110 can work individually and independently of the other functional units or circuits. The fourth device 110 can work individually and independently from the third device 108 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium including instructions for performing the software function, a portion therein, or a combination thereof.

For illustrative purposes, the navigation system 100 is described by operation of the third device 108 and the fourth device 110. It is understood that the third device 108 and the fourth device 110 can operate any of the modules and functions of the navigation system 100.

Figure 7:
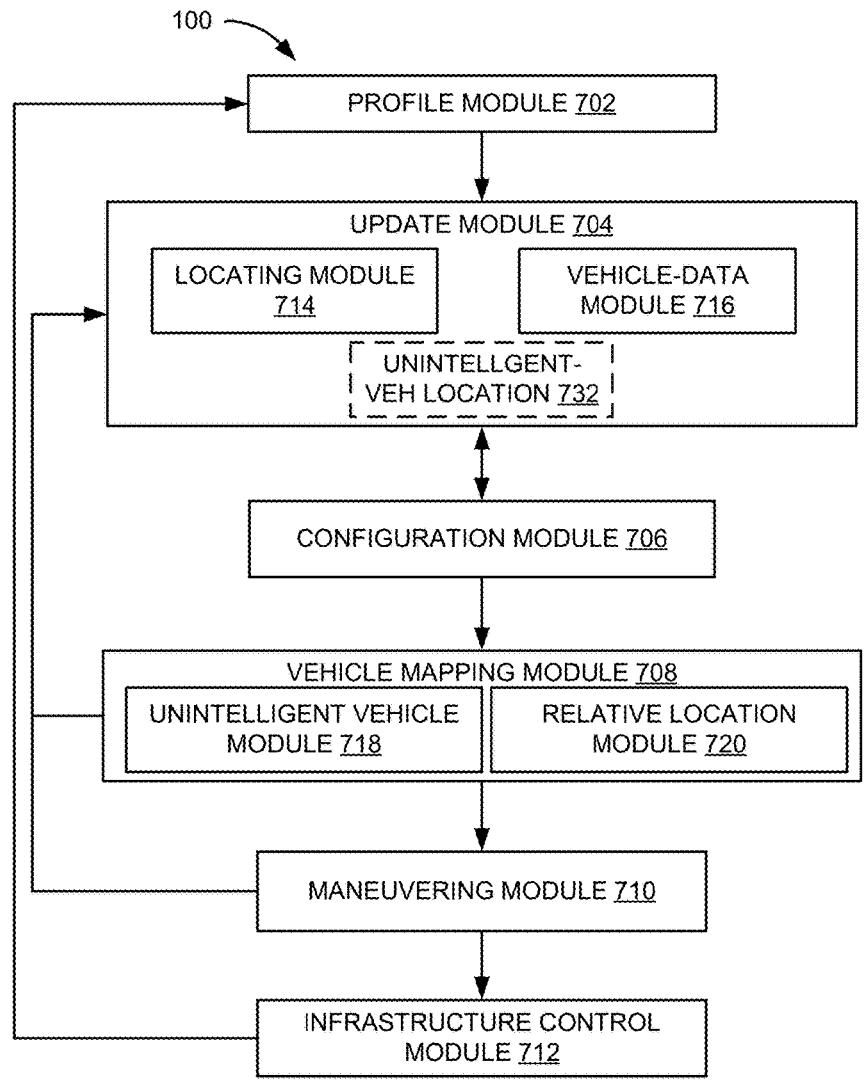
FIG. 7 is a control flow of the navigation system.

Referring now to FIG. 7, therein is shown a control flow of the navigation system 100. The navigation system 100 can include a profile module 702, an update module 704, a configuration module 706, a vehicle mapping module 708, a maneuvering module 710, an infrastructure control module 712, or a combination thereof.

The profile module 702 can be coupled to the update module 704. The update module 704 can be coupled to the configuration module 706. The configuration module 706 can be coupled to the vehicle mapping module 708. The vehicle mapping module 708 can be coupled to the maneuvering module 710. The maneuvering module 710 can be coupled to the infrastructure control module 712.

The modules can be coupled using wired or wireless connections, by including an output of one module as an input of the other module, by including operations of one module influence operation of the other module, or a combination thereof. The modules can be directly coupled with no intervening structures or objects other than the connector there-between, or indirectly coupled.

The profile module 702 is configured to manage information regarding one or more users of the navigation system 100. The profile module 702 can manage information by initiating, storing, updating, matching, or a combination thereof for the device profile 401 of FIG. 4, the first-device navigation profile 320 of FIG. 3, the third-device navigation profile 322 of FIG. 3, user account information for the user 112 of FIG. 1, or a combination thereof.

For example, the profile module 702 can interact with the user 112 to create or initialize a user account including user's identification, contact information, preferences, vehicle ownership or usage information, or a combination thereof. As a more specific example, the profile module 702 can identify the user 112 and the device identification 402 of FIG. 4 for a device owned by, operated by, associated with, used by, or a combination thereof for the user 112. Also as a more specific example, the profile module 702 can manage the access profile 404 of FIG. 4 for the user 112, a device associated with the user 112, or a combination thereof.

Also for example, the profile module 702 can update or store changes to the user account. Also for example, the profile module 702 can identify and store other processing results discussed below, such as patterns or real-time information for the user 112, in the device profile 401. As a more specific example, the profile module 702 can record or access historical information such as previous searches requested by the user 112 to the navigation system 100, previously requested routes, previous locations of the user 112 or a device associated thereto, or a combination thereof.

The profile module 702 can receive or detect information regarding the user 112 using one or more user interfaces of one or more devices, such as the first user interface 518 of FIG. 5, the second user interface 538 of FIG. 5, the third user interface 618 of FIG. 6, the fourth user interface 638 of FIG. 6, the vehicle user interface, or a combination thereof. The profile module 702 can further receive or detect information regarding the user 112 using one or more communication circuits, such as the first communication circuit 516 of FIG. 5, the second communication circuit 536 of FIG. 5, the third communication circuit 616 of FIG. 6, the fourth communication 636 of FIG. 6, the vehicle communication circuit 204 of FIG. 2, or a combination thereof. The profile module 702 can further receive or detect information regarding the user 112 using one or more location circuits, such as the first location circuit 520 of FIG. 5, the third location circuit 620 of FIG. 6, the fourth location circuit 652 of FIG. 6, the vehicle location circuit, or a combination thereof.

The profile module 702 can manage the received or detected information using one or more control circuits, such as the first control circuit 512 of FIG. 5, the second control circuit 534 of FIG. 5, the third control circuit 612 of FIG. 6, the fourth control circuit 634 of FIG. 6, the vehicle control circuit 206 of FIG. 2, or a combination thereof. The profile module 702 can store the user information, such as the device profile 401 or the user account information, in one or more storage circuits, such as the first storage circuit 514 of FIG. 5, the second storage circuit 546 of FIG. 5, the third storage circuit 614 of FIG. 6, the fourth storage circuit 646 of FIG. 6, the vehicle storage circuit 208 of FIG. 2, or a combination thereof.

After manage information regarding the one or more end users, the control flow can pass from the profile module 702 to the update module 704. For example, the control flow can pass by containing a processing result, such as the user account information or the device profile 401, as an output from the profile module 702 to an input of the update module 704.

Also for example, the control flow can further pass by storing the processing result at a location known and accessible to the update module 704. Also for example, the control flow can further pass by notifying the update module 704, such as by using a flag, an interrupt, a status signal, or a combination thereof. Also for example, the control flow can further pass using a combination of the processes described above.

The update module 704 is configured to identify or determine real-time information regarding one or more users. The update module 704 can identify or determine the real-time information, such as location of the user 112, a location of one or more devices or vehicles associated with the user 112, other sensed or detected information from the one or more devices or vehicles associated with the user 112, or a combination thereof.

For example, the update module 704 can identify or determine locations of the first device 102 of FIG. 1, the second device 106 of FIG. 1, the third device 108 of FIG. 1, the fourth device 110 of FIG. 1, the smart vehicle 202 of FIG. 2, or a combination thereof. The update module 704 can identify the first-device location 302 of FIG. 3, the third-device location 304 of FIG. 3, fourth-device location 306 of FIG. 3, or a combination thereof calculated or determined at and reported by the first device 102, the third device 108, the fourth device 110, the smart vehicle 202, or a combination thereof.

Also for example, the update module 704 can determine sensory or status information of the device associated with the user 112. As a more specific example, the update module 704 can determine sensory or status information of the first device 102, the third device 108, the fourth device 110, or a combination thereof. Also as a more specific example, the update module 704 can determine the smart vehicle data 222 of FIG. 2.

The update module 704 can identify or determine real-time information using a locating module 714, a vehicle-data module 716, or a combination thereof. The locating module 714 is configured to identify the current location of the user 112, device or vehicles corresponding to the user 112, or a combination thereof.

The locating module 714 can identify the current location based on current location information detected, calculated, reported, or a combination thereof by the first device 102, the third device 108, the fourth device 110, or a combination thereof. For example, the locating module 714 can identify the current location including the first-device location 302, the third-device location 304, the fourth-device location 306, or a combination thereof based on one or more location circuits of the corresponding device as discussed above.

The locating module 714 can further identify the current location based on the current location information detected, calculated, reported, or a combination thereof by the smart vehicle 202. For example, the locating module 714 can identify the first-device location 302, the third-device location 304, the fourth-device location 306, or a combination thereof based on one or more location circuits of the smart vehicle 202. The first-device location 302, the third-device location 304, the fourth-device location 306, or a combination thereof can represent the smart vehicle 202 or a location thereof.

As a further illustrative example, the locating module 714 can include the various device location calculated at or with each corresponding device using the location circuit therein. The first device 102 or the smart vehicle 202 can calculate the first-device location 302 using GPS signals, receivers, processes, or a combination thereof. The third device 108 and the fourth device 110 can similarly calculate the current location.

Continuing with the example, the locating module 714 can further include the devices communicating their current location with other devices. The locating module 714 can include transmitting and receiving the corresponding device locations, including transmitting the first-device location 302 from the first device 102 or the smart vehicle 202, receiving the first-device location 302 at the second device 106, or a combination thereof. Other devices, such as the third device 108, the fourth device 110, the first device 102, the second device 106, and similarly communicate with each other.

The locating module 714 can identify the current location of a user device corresponding to a specific vehicle, including a particular instance of the unintelligent vehicle 224 of FIG. 2 or the smart vehicle 202. For example, the locating module 714 can identify the third-device location 304 for the cell phone of the user 112 driving or occupying the unintelligent vehicle 224. Also for example, the locating module 714 can identify the first-device location 302 from the cell phone of the user 112 driving or occupying the smart vehicle 202 instead of or in addition to location information directly from the smart vehicle 202.

The locating module 714 can match the current location to the specific cars using the output of the profile module 702, such as the device profile 401 or the user account information. For example, the locating module 714 can use the user account information to match the current information to a type of vehicle or a specific vehicle identification.

As a more specific example, the locating module 714 can use the user account information, the device profile 401, or a combination thereof corresponding to the device represented by the current location to identify an unintelligent-vehicle location 732. The server or the service provider, such as the second device 106, can determine the unintelligent-vehicle location 732 based on receiving the location information from the user device, such as the third device, associated with the unintelligent vehicle 224 and attributing the current location as the unintelligent-vehicle location 732 based on the user account information, the device profile 401, or a combination thereof.

The unintelligent-vehicle location 732 is a representation of the current location for the unintelligent vehicle 224. The unintelligent-vehicle location 732 can be determined based on the current location of a user device known or likely to be within the unintelligent vehicle 224. The unintelligent-vehicle location 732 can further be determined based on the smart vehicle data 222 from the smart vehicle 202 near or adjacent to the unintelligent vehicle 224 as discussed below.

For illustrative purposes, the first-device location 302 will be described as representing the location of the smart vehicle 202, the location of the first device 102 and the user 112 within the smart vehicle 202, or a combination thereof. Also for illustrative purposes, the third-device location 304 will be described as representing the location of the user device within the unintelligent vehicle 224 and synonymous to the unintelligent-vehicle location 732.

The vehicle-data module 716 is configured to determine and manage the smart vehicle data 222. The vehicle-data module 716 can determine the smart vehicle data 222 from the environmental sensors 210 of FIG. 2 of the smart vehicle 202.

The vehicle-data module 716 can determine the smart vehicle data 222 by processing the environmental sensors 210 of a vehicle built or integrated within the smart vehicle 202. The vehicle-data module 716 can also receive at the server or the service provider as illustrated by the second device 106, at another instance of the smart vehicle 202 or the user device as illustrated by the first device 102 or the third device 108, the smart vehicle data 222 transmitted from the smart vehicle 202.

For example, the vehicle-data module 716 can implement or utilize the environmental sensors 210 to obtain various information including the smart vehicle data 222 from the first device 102, the fourth device 110, the smart vehicle 202, or a combination thereof. The environmental sensors 210 can provide information about the first device 102, the third device, the fourth device 110, the smart vehicle 202, the unintelligent vehicle 224, an area or a situation surrounding the corresponding device, or a combination thereof.

The vehicle-data module 716 can implement or facilitate direct communication of the smart vehicle data 222 or other information associated with the vehicle or location directly between vehicles or user devices. The vehicle-data module 716 can further implement or facilitate communication of the smart vehicle data 222 or other information through the server or the service provider.

The vehicle-data module 716 can also process the smart vehicle data 222 sensed by the first device 102, the smart vehicle 202, or a combination thereof. The vehicle-data can further process the smart vehicle data 222 representing the further vehicle, the fourth device 110, or a combination thereof. As an example, the further vehicle can be identified by the smart vehicle data 222 processed by the smart vehicle 202 environmental sensors 210. Furthermore, real-time information of the further vehicle can be received by the first device 102, the smart vehicle 202, or a combination thereof.

The navigation system 100 can utilize the smart vehicle data 222 to process information regarding vehicles other than the smart vehicle 202 sourcing or generating the smart vehicle data 222. The smart vehicle data 222 can represent other vehicles, such as the unintelligent vehicle 224 or another instance of the smart vehicle 202, as sensed by the smart vehicle 202 generating the smart vehicle data 222. For example, the navigation system 100 can determine location information and proximity-based information for other vehicles including the unintelligent vehicle 224 or another instance of the smart vehicle 202 based on the smart vehicle data 222.

The update module 704 can identify, determine, further process or match, or a combination thereof for the real-time information using one or more control circuits as discussed above. The update module 704 can store the real-time information, such as the device location or the smart vehicle data 222, in one or more storage circuits as discussed above. The update module 704 can further communicate or exchange various information between devices using one or more communications circuits as discussed above.

After identifying or determining the real-time information, the control flow can pass from the update module 704 to the configuration module 706. The control flow can pass similarly as described above between the profile module 702 and the update module 704, but using processing results of the update module 704, such as the device current location, the smart vehicle data 222, or a combination thereof.

The configuration module 706 is configured to process and determine the smart vehicle data 222 through a cloud, server, service provider, hub, networking manager, or hardware that has the ability to transfer data. The configuration module 706 can further resolve the uploading designation for the smart vehicle data 222. The configuration module 706 can be process by the first device 102, the second device 106, the fourth device 110, the smart vehicle 202, the user 112, the server, the network 104 of FIG. 1, or a combination thereof.

The configuration module 706 can further simplify the processing of the smart vehicle data 222 by dividing up the navigation map 308 of FIG. 3 to smaller sections or unit areas or cells. For example, the configuration module 706 can process information according to or from a smaller section of the navigation map 308 to avoid overloading the server, the second device 106, or a combination thereof, versus processing the information as a whole.

The configuration module 706 can also identify the smart vehicle 202, the first device 102, the fourth device 110, or a combination thereof within the smaller sections in the navigation map 308 to process the uploading designation 406 of FIG. 4. As a result, the configuration module 706 can determine the uploading designation 406 for the smart vehicle 202, an end-user device, or a combination thereof within the relevant vehicle area 310 of FIG. 3. This allows the configuration module 706 to determine which smart vehicle 202 has the highest capability on uploading to the network 104.

In addition to selecting the smart vehicle 202 with the highest capability to upload to the network 104, the configuration module 706 can also account for the smart vehicle 202 with the highest bandwidth. For example, the smart vehicle 202 with the highest bandwidth can be the vehicle, which is processing the least amount of tasks or data within the smaller sections of the navigation map 308, or the whole navigation map 308.

The configuration module 706 can further designate the transfer of the smart vehicle data 222 through a limited number of devices with the uploading designation 406 acting as the gateway. As an illustrative example, the smart vehicle 202 can be selected as the device with the uploading designation 406 based on containing the highest capability to transfer the smart vehicle data 222 from the smart vehicle 202 and the further vehicle. The smart vehicle data 222 can be transferred from the smart vehicle 202, the further vehicle, or a combination thereof to the smart vehicle 202. The configuration module 706 can process the smart vehicle data 222 through the smart vehicle 202 to the server, the second device 106, or a combination thereof.

The device corresponding to the uploading designation 406 can manage the smart vehicle data 222 from multiple vehicles within a portion of the navigation map 308 corresponding to the unit area represented in the navigation map 308. The device corresponding to the uploading designation 406 can collect the smart vehicle data 222 from multiple vehicles, communicate the smart vehicle data 222 from multiple vehicles or a processing result thereof to the server or the second device 106, or a combination thereof.

The device corresponding to the uploading designation 406 can further process the collected data before uploading, such as for sorting, summarizing, compressing, performing pattern recognition, calculating change or difference from the data at previous time or communication, or a combination thereof. The device can upload the result of such processes in place of the collected data.

The configuration module 706 can process the vehicle information and determine the most suitable option to upload the vehicle information using one or more control circuits as discussed above. The configuration module 706 can store the vehicle information, such as the smart vehicle data 222 and the capability of the vehicle, in one or more storage circuits as discussed above. The configuration module 706 can further communicate or exchange various information between devices using one or more communications circuits as discussed above.

After determining the strategy to upload the smart vehicle data 222 for multiple vehicles, the control flow can pass from the configuration module 706 to the vehicle mapping module 708. For example, the control flow can pass by processing the smart vehicle data 222 through the first device 102, the second device 106, the fourth device 110, or a combination thereof. Once the smart vehicle data 222 has been processed by one of the appropriate parties then the control flow can pass to the vehicle mapping module 708.

The vehicle mapping module 708 is configured to determine an arrangement or a relative positioning of the vehicles within the unit area of the navigation map 308. The vehicle mapping module 708 can determine and further identify the vehicles within the relevant vehicle area 310 on the navigation map 308.

The relevant vehicle area 310 can represent the instance of the unit area of the navigation map 308 being processed by the vehicle mapping module 708. For illustrative example, the relevant vehicle area 310 can be the instance of the unit area, which are within the first device 102, the third device 108, the fourth device 110, the user 112, the smart vehicle 202, the unintelligent vehicle 224, or a combination thereof. The vehicle mapping module 708 can determine the arrangement or the relative positions of the vehicles based on the smart vehicle data 222, other data from end-user devices, or a combination thereof.

The vehicle mapping module 708 can further determine the direction of travel relative to the road or segment of the navigation map 308. As an example, the vehicle mapping module 708 can use the GPS coordinates from the smart vehicle data 222 or a sequence thereof and extrapolate the direction of travel. Also as an example, the vehicle mapping module 708 can use the location information, such as accelerometer data or gyroscope data, from corresponding device to determine the direction of travel. The vehicle mapping module 708 can also use the direction of travel to indicate the reference point for the front or back of the vehicle, as well as the left or right side of the vehicle.

The vehicle mapping module 708 can also determine the arrangement or the relative positioning based on the smart-sensor zone 312 of FIG. 3 of the smart vehicle 202, the end-user device, or a combination thereof. The smart vehicle data 222 processed according to the smart-sensor zone 312 can provide details and information about the corresponding area of the map, the pre-designated cell within the navigation map, or a combination thereof. The vehicle mapping module 708 can further manage the smart-sensor zone 312 to identify all the vehicles within the zone, the distance between vehicles, the orientation of vehicles relative to other vehicle or the road, or a combination thereof.

The vehicle mapping module 708 can identify the smart-sensor zone 312 based on identity or profile information of the corresponding device. For example, the vehicle mapping module 708 can identify the smart-sensor zone 312 for each of the device sourcing the smart vehicle data 222 based on the device profile 401, the device identification 402, the access profile 404, or a combination thereof.

As a more specific example, the vehicle mapping module 708 can identify the smart-sensor zone 312 including a sensed area relative to the device, an accuracy distance relative to the device, a focal distance relative to the device, or a combination thereof according to specification or characteristic of the device known to the navigation system 100. The vehicle mapping module 708 can identify the smart-sensor zone 312 by determining the specified areas or locations matching the device identification 402 relative to the current location, the current heading, or a combination thereof of the corresponding device.

The vehicle mapping module 708 can determine the arrangement or the relative positioning by generating the area profile 314 of FIG. 3 corresponding to the relevant vehicle area 310. The vehicle mapping module 708 can generate the area profile 314 using an unintelligent vehicle module 718, a relative location module 720, or a combination thereof.

The unintelligent vehicle module 718 is configured to identify the current location of the unintelligent vehicle 224. The unintelligent vehicle module 718 can locate the unintelligent vehicle 224 by calculating the unintelligent-vehicle location 732.

The navigation system 100 can determine the unintelligent-vehicle location 732 based on the current location of the end-user device known to be associated with the unintelligent vehicle 224 as discussed above. The navigation system 100 can further determine the unintelligent-vehicle location 732 based on processing the smart vehicle data 222. The navigation system 100 can utilize data representing observations from the smart vehicle 202 to determine geographic locations of the unintelligent vehicle 224.

The unintelligent vehicle module 718 can also the smart vehicle data 222 based on identifying the smart vehicle 202 producing the smart vehicle data 222 according to the device profile 401. As an example, the unintelligent vehicle module 718 can identify the smart vehicle 202 based on the device identification 402, make, model, shape, the design cue of the vehicle image, or a combination thereof. The unintelligent vehicle module 718 can further utilize the device profile 401 to determine the unintelligent-vehicle location 732.

The unintelligent vehicle module 718 can also process the smart vehicle data 222 to identify the unintelligent-vehicle location 732 and coordinates of the unintelligent vehicle 224. As an example, the smart vehicle data 222 can calculate or analyze the identification of vehicles detected in the visual sensor 214 of FIG. 2, the radar sensor 216 of FIG. 2, or a combination thereof.

Continuing with the example, the unintelligent vehicle module 718 can match the visual cues, such as color, make, model, vehicle license or identification information, shape, size, or a combination thereof to a template known to or predetermined by the navigation system 100 to identify the observed vehicles. The unintelligent vehicle module 718 can further identify the user 112 within or operating the identified vehicle or the end-user device thereof, such exemplified by the third device 108, based on matching the vehicle identification or specification to one or more instances of the device navigation profile, the device profile 401, other profile or account information linking or identifying relationship between each user and corresponding vehicles, historical data, or a combination thereof.

The unintelligent vehicle module 718 can thus identify the vehicles observed from perspective of each instance of the smart vehicle 202 using the corresponding set of the smart vehicle data 222. The unintelligent vehicle module 718 can identify each of the observed vehicles as other instances of the smart vehicle 202, the unintelligent vehicle 224 known to the navigation system 100, or other vehicles unknown to the navigation system 100.

The unintelligent vehicle module 718 can further locate each of the vehicles observed from perspective of each smart vehicle 202. The unintelligent vehicle module 718 can calculate coordinates or location information relative to a fixed reference. The unintelligent vehicle module 718 can calculate the corresponding locations of the observed vehicles based on the smart-sensor zone 312 associated with the smart vehicle data 222, based on combining other instances of the smart vehicle data 222 from other vehicles within the relevant vehicle area 310, or a combination thereof.

As a more specific example, the unintelligent vehicle module 718 can calculate the location of the observed vehicle based on the current location of the smart vehicle 202 or the end-user device, such as the first-device location 302 or the fourth-device location 306, providing the smart vehicle data 222 or the corresponding sensor data as a basis.

The unintelligent vehicle module 718 can calculate the location as a coordinate or a location within the smart-sensor zone 312 adjusted, mapped, or translated based on the current location.

Also as a more specific example, the unintelligent vehicle module 718 can include a process or an equation predetermined by the navigation system 100 to analyze shapes, sizes, orientations, timings or delays, signatures, or a combination thereof corresponding to representations of vehicles captured in the smart vehicle data 222. The unintelligent vehicle module 718 can utilize the predetermined process or equation to calculate an adjustment, a distance, an angle, a relative separation measure, or a combination for the observed vehicle based on the analysis.

Continuing with the more specific example, the unintelligent vehicle module 718 can further calculate the coordinates based on combining the current location of the sensing vehicle or device with the calculated adjustment, distance, angle, relative separation measure, or a combination thereof. The unintelligent vehicle module 718 can further calculate the coordinates of the observed vehicle as an average or a mid-point between the coordinates of the devices or vehicles observing or detecting the observed vehicle.

Also as a more specific example, the unintelligent vehicle module 718 can calculate the location of the observed vehicle based on separate instances of the smart vehicle data 222 from multiple vehicles observing the same geographic location. The unintelligent vehicle module 718 can calculate the location of the observed vehicle based on detecting the same vehicle in each instance of the smart-sensor zone 312 overlapping each other. The unintelligent vehicle module 718 can further utilize data associated with multiple sources or multiple overlapping observations, such as triangulation mechanism, utilizing known signals or observations for overlapping regions from multiple devices or vehicles within the relevant vehicle area 310 to calculate the location of one or more vehicles commonly observed by the multiple devices or vehicles.

Also as a more specific example, the unintelligent vehicle module 718 can calculate the location of the observed vehicle using a combination of above examples. The vehicle mapping module 708 can utilize the calculated location result to verify the various device locations or other results of the locating module 714. The vehicle mapping module 708 can further locate and track other vehicles unknown or unidentified by the navigation system 100 as discussed above.

The unintelligent vehicle module 718 can calculate the unintelligent-vehicle location 732 as the calculated location for the observed vehicle identified or known as the unintelligent vehicle 224. The unintelligent vehicle module 718 can further determine the unintelligent-vehicle location 732 by processing the GPS coordinates or data obtain with the second device 106, the server, or a combination thereof. As an example, the third device 108 can provide the unintelligent-vehicle location 732 through the server. The unintelligent vehicle module 718 can further determine or verify the unintelligent-vehicle location 732 based on matching or detecting an overlap between the GPS coordinates of the end-user device reporting the GPS location and the calculated location of the observed vehicle.

The relative location module 720 can determine relative locations or geographical relationship between vehicles. The relative location module 720 can determine relative locations between vehicles in the relevant vehicle area 310. The relative location module 720 can determine relative locations from one or more perspectives of vehicles within the relevant vehicle area 310. The relative location module 720 can determine relative locations based on generating the area profile 314 for the relevant vehicle area 310.

The relative location module 720 can generate the area profile 314 based on the location, the orientation, the direction of travel, for all vehicles detected or observed within the relevant vehicle area 310. The relative location module 720 can generate the area profile 314 based on identifying or locating the vehicles according to the unit areas of the maps. The relative location module 720 can generate the area profile 314 based on locating and tracking all known and observed vehicles within each corresponding unit areas of the maps.

The relative location module 720 can further generate the area profile 314 based on identifying the location of each vehicle within each of the unit areas relative to one or more instances of the traffic lane 228 of FIG. 2 therein. The relative location module 720 can generate the area profile 314 based on identifying the lane being utilized by each of the vehicles. The relative location module 720 can identify the specific lane being utilized by each of the vehicles in a variety of ways.

For example, the relative location module 720 can identify the specific lane based on comparing the location information resulting from processes discussed above along with lane locations or coordinates corresponding to the navigation map 308. Also for example, the relative location module 720 can utilize the smart vehicle data 222 such as image or radar results to identify the specific lane. The relative location module 720 can identify the specific lane based on processing the size, the shape, the orientation, or a combination thereof as exemplified above.

Also for example, the relative location module 720 can further identify the specific lane of travel based on identifying lane markers, street signs, traffic signs, or a combination thereof from the smart vehicle data 222. The relative location module 720 can use the location of the identified lane markers, street signs, traffic signs, or a combination thereof relative to the sensing vehicle, other observed vehicles, or a combination thereof to identify the specific lane of travel for the corresponding vehicle.

Also for example, the relative location module 720 can identify the specific lane of travel based on various sensors or transmitters in the relevant vehicle area 310. The relative location module 720 can utilize information from internet of things (IoT) devices, cameras, markers, transmitters, or a combination thereof stationary or fixed on the road, located near the road, or a combination thereof. Also for example, the relative location module 720 can utilize a combination of the methods or processes discussed above or other methods.

The relative location module 720 can further determine the lane-level relationship 316 of FIG. 3 between vehicles in the relevant vehicle area 310. The relative location module 720 can determine the lane-level relationship 316 for two or more vehicles, such as for vehicles traveling in adjacent lanes or in the same lane.

The relative location module 720 can determine the lane-level relationship 316 based on lane-information according to the navigation map 308 and the current traveling lane information for each of the vehicles. The relative location module 720 can further determine lane-level relationship 316 based on the smart vehicle data 222.

For example, the relative location module 720 can determine the lane-level relationship 316 between two vehicles detected in the image based on analyzing the shapes, the colors, the relative relationship, relative to lane markers, or a combination thereof. As a more specific example, the relative location module 720 can determine vehicles as being adjacent to each other based on overlapping images of vehicles, or based on shape or color of one vehicle being disrupted by another vehicle.

Also as a more specific example, the relative location module 720 can determine the lane-level relationship 316 between the smart vehicle 202 generating the smart vehicle data 222 and other vehicles detected in the smart vehicle data 222. The relative location module 720 can determine the lane-level relationship 316 based on the smart-sensor zone 312, vehicle size, lane markers, or a combination thereof. Also as a more specific example, the relative location module 720 can determine the lane-level relationship 316 based on identifying and locating lane-markers, traffic signs, traffic signals, other landmarks, or a combination thereof relative the detected vehicles. Also as a more specific example, the relative location module 720 can utilize a combination of the methods or processes exemplified above.

The relative location module 720 can further determine the relationship of the vehicles based on the area profile 314. For example, the relative location module 720 can utilize the lane-level relationship 316 for each vehicle to determine the location, orientation, interaction, or a combination thereof of each vehicle within each other. The relative location module 720 can further utilize the lane-level relationship 316 between the first device 102, the third device 108, the fourth device 110, the smart vehicle 202, the unintelligent vehicle 224, or a combination thereof. The relative location module 720 can further identify the relationship between vehicles in each segment or section within the navigation map 308.

The relative location module 720 can also determine which vehicles are in front, behind, next lane, adjacent, or the sequence of order relative to each other. As an example, the relative location module 720 can establish that the smart vehicle 202 is in front of the further vehicle, the unintelligent vehicle 224 is adjacent to the further vehicle, or it could be any combination thereof.

The relative location module 720 can also generate the area profile 314 for the unintelligent-vehicle location 732 based on the smart vehicle data 222. Furthermore, the relative location module 720 can also establish the geographic relationship between the unintelligent vehicle 224, the smart vehicle 202, the further vehicle, or a combination thereof.

The vehicle mapping module 708 can determine the relative locations of vehicles within an area and establish the direction of travel for each vehicle, using one or more control circuits as discussed above. The vehicle mapping module 708 can store the information of locations and coordinates of the vehicles in one or more storage circuits as discussed above. The vehicle mapping module 708 can further communicate or exchange various information between devices using one or more communications circuits as discussed above.

After determining and identifying the relevant vehicle area 310 and generating the relationships between multiple vehicles, the control flow can pass from the vehicle mapping module 708 to the maneuvering module 710. For example, the control flow can pass by processing the smart vehicle data 222 and extrapolating the location of the unintelligent vehicle 224 to generate the relationship between multiple vehicles then the control flow can pass to the vehicle mapping module.

The maneuvering module 710 is configured to generate information, control signal, or a combination thereof based on the area profile 314. The maneuvering module 710 can generate information, control signal, or a combination thereof for implementation or communication at one or more devices or vehicles in the relevant vehicle area 310.

The maneuvering module 710 can generate information, control signals, or a combination thereof based on the formation of the current driving profile 408 of FIG. 4. The maneuvering module 710 can generate the current driving profile 408 to determine where vehicles can travel, maneuver, avoid, move, pass through, or a combination thereof. The maneuvering module 710 can provide a best path, route, or navigation based on the area profile 314 within the navigation map 308. The maneuvering module 710 can generate the current driving profile 408 based on the area profile 314 for controlling one or more vehicles, including the unintelligent vehicle 224, according to the current driving profile 408. The maneuvering module 710 can generate the current driving profile 408 and communicate the profile from the first device 102, the second device 106, the fourth device 110, the smart vehicle 202, the network 104, the further vehicle, or a combination thereof.

For example, the maneuvering module 710 processes smart vehicle data 222 that are sent from the first device 102, the second device 106, the fourth device 110, the smart vehicle 202, the network 104, the further vehicle, or a combination thereof. As a further example, the maneuvering module 710 can generate the current driving profile 408 based on the area profile 314 generated by the vehicle mapping module 708 that can be processed to provide guidance on the best path forward, travel, journey, navigation, or a combination thereof for the smart vehicle 202, the unintelligent vehicle 224, the first device 102, the third device 108, the fourth device 110, or a combination thereof. The maneuvering module 710 can generate the current driving profile 408 using the first device 102, the second device 106, the third device 108, the fourth device 110, the smart vehicle 202, or a combination thereof.

The maneuvering module 710 can generate the current driving profile 408 based on the current movement of one or more vehicles, the relative relationship or locations between vehicles, or a combination thereof. The maneuvering module 710 can generate the adjacent lane status 410 of FIG. 4, the proximity status 412 of FIG. 4, the sudden stop status 416 of FIG. 4, or a combination thereof.

The maneuvering module 710 can generate the adjacent lane status 410 based on the relative locations, the lane-change zone 226 of FIG. 2, the device location, the smart-sensor zone 312, the device navigation profile, the area profile 314, or a combination thereof. For example, the maneuvering module 710 can generate the adjacent lane status 410 for the unintelligent vehicle 224 when another vehicle enters or is within the lane-change zone 226 of the unintelligent vehicle 224.

The maneuvering module 710 can also generate the proximity status 412 based on locations of vehicles within the relevant vehicle area 310, mismatching acceleration vectors between vehicles, or a combination thereof. For example, the maneuvering module 710 can generate the proximity status 412 for communication to an occupant of the unintelligent vehicle 224 or the user 112 of the third device 108 therein based on calculating a distance between the third-device location 304 or the unintelligent-vehicle location 732 and another vehicle in front thereof in the same instance of the traffic lane 228. The maneuvering module 710 can generate the proximity status 412 when the calculated distance is below or within a distance defined by the proximity threshold 414 of FIG. 4.

Also for example, the maneuvering module 710 can generate the proximity status 412 for the unintelligent vehicle 224 based on velocity vectors, acceleration vector, or a combination thereof between vehicles determined to be adjacent without any vehicle between the two. The maneuvering module 710 can generate the proximity status 412 when the vectors of the adjacent vehicles do not align in the same direction.

As a more specific example, the maneuvering module 710 can generate the proximity status 412 for the unintelligent vehicle 224 when the velocity vector or acceleration vector thereof is in the direction of travel while the vehicle in front corresponds to the acceleration vector opposite the direction of travel. Also as a more specific example, the maneuvering module 710 can generate the proximity status 412 when the two acceleration vectors for the two vehicles are in the same direction but when a difference in magnitude thereof exceeds the proximity threshold 414.

Also as a more specific example, the maneuvering module 710 can similarly generate the proximity status 412 based on vectors orthogonal or to right or left of the direction of travel. Also as a more specific example, the maneuvering module 710 can generate the proximity status 412 using a combination of processes or methods exemplified above or using other processes or methods. The maneuvering module 710 can communicate the proximity threshold 414 to or through the third device 108 within the unintelligent vehicle 224 for alerting the passengers therein.

The maneuvering module 710 can further utilize the sudden stop status 416 processed within the current driving profile 408. The maneuvering module 710 can generate the sudden stop status 416 based on movement information, such as acceleration data satisfying the sudden stop threshold 418 of FIG. 4, for one or more of the vehicles in the relevant vehicle area 310. The maneuvering module 710 can communicate the sudden stop status 416 to one or more vehicles, including the unintelligent vehicle 224 or the smart vehicle 202 or devices therein, following or behind the vehicle corresponding to the deceleration.

The maneuvering module 710 can further process the emergency-vehicle notice 422 of FIG. 4. The maneuvering module 710 can process the emergency-vehicle notice 422 based on location information, route information, current movement information, or a combination thereof from or representing one or more emergency vehicles within the relevant vehicle area 310. The maneuvering module 710 can generate the emergency-vehicle notice 422 for one or more vehicles or devices therein located within a threshold distance from, along the navigation route thereof, within the same road segment or approaching the same road segment, or a combination thereof relative to the emergency vehicle. The maneuvering module 710 can communicate the emergency-vehicle notice 422 to or through the corresponding vehicles or the end user devices therein for notifying the passengers within the corresponding vehicles.

The maneuvering module 710 can further calculate the emergency-vehicle clearance control 424 of FIG. 4 for the corresponding vehicles, such as for directing the drivers to follow specific maneuvers or for directly controlling or directing self-driving vehicles. The maneuvering module 710 can include a process or a method predetermined by the navigation system 100 for generating a travel lane for the emergency vehicle entering or within the relevant vehicle area 310.

The maneuvering module 710 can utilize the predetermined process or method to design the travel lane and calculate the corresponding or necessary maneuvers for each of the vehicles for calculating the emergency-vehicle clearance control 424. The maneuvering module 710 can communicate the emergency-vehicle clearance control 424 to or through the corresponding vehicles or devices therein.

The maneuvering module 710 can also generate the current driving profile 408 managing the accessory control 426 of FIG. 4. For example, the maneuvering module 710 can process the smart vehicle data 222 from the smart vehicle 202 that refers to the current environment, weather, amount of sunlight, vehicle's internal temperature, or a combination thereof. Also for example, the maneuvering module 710 can process the accessory control 426 based on accessory status or change thereof for vehicles.

Therefore, the maneuvering module 710 can provide direction, advice, notice, warning, navigation, automatic control, or a combination thereof to modify or change the vehicle's setting such as turning a windshield wiper, turning on internal or external lights, adjusting the temperature, or a combination thereof. The maneuvering module 710 can communicate the current driving profile 408 to vehicles or devices therein trailing the smart vehicles sensing the various conditions or for vehicles corresponding to routes leading to the sensing vehicles.

The maneuvering module 710 can generate instructions, direction, navigation to vehicles by updating the current driving profile 408 using one or more control circuits as discussed above. The maneuvering module 710 can store the directions, notices, and navigation in one or more storage circuits as discussed above. The maneuvering module 710 can further communicate or exchange various information between devices using one or more communications circuits as discussed above.

After generating and providing direction, control, navigation by the maneuvering module 710, the control flow can pass from the maneuvering module 710 to the infrastructure control module 712. The new maneuver, direction, adjustment, travel, navigation, control, or a combination thereof can pass to the infrastructure control module 712 to check, review, or acquire guidance about the external factors around the vehicle such as train, bridge, bus, or infrastructure.

The control flow can also pass from the maneuvering module 710 back to the update module 704. New updates and information can be process by receiving new or updated smart vehicle data 222 allowing the flow to go to the update module 704. For example, the control flow can pass by processing the smart vehicle data 222 in the maneuvering module 710 which will generate the current driving profile 408. The adjustment in the maneuvering module 710 can influence change of locations and navigation therefore a need to update information in the update module 704.

The infrastructure control module 712 is configured to manage one or more vehicles with respect to a geographical area. The infrastructure control module 712 can manage by providing notices and suggestions to scheduling authorities based on traffic context and conditions. The infrastructure control module 712 can further control or coordinate multiple vehicles to manage traffic flow, such as for traffic controller services.

The infrastructure control module 712 can manage based on the smart vehicle data 222 corresponding to the area. The infrastructure control module 712 can provide notifications and announcements based on generating the area management profile 428 of FIG. 4. The infrastructure control module 412 can generate the area management profile 428 for a given geographical area based on the area profile 314, the smart vehicle data 222, the traffic condition 318 of FIG. 3, the current driving profile 408, or a combination thereof.

The infrastructure control module 712 can further generate the area management profile 428 that can create, modify, or change an actual schedule to optimize traffic condition corresponding to the area profile 314. The infrastructure control module 712 can also provide information that can change, control, or direct the smart vehicle 202, the unintelligent vehicle 224, the further vehicle, or a combination thereof. The infrastructure control module 712 can further influence the first device 102, the third device 108, the fourth device 110, or a combination thereof.

For example, the infrastructure control module 712 can generate the area management profile 428 based on calculating a specific maneuver, such as a turn or a lane change, a route, a travel speed or acceleration, or a combination thereof for each of the vehicles in the given area. The infrastructure control module 712 can calculate the desired maneuvers or actions of each vehicles to achieve a target condition, such as maximization of overall travel speed for the given area or maximization of travel speed for a specific vehicle including emergency vehicles. The infrastructure control module 712 can include various contexts, corresponding target conditions, factors or mechanisms for calculation, or a combination thereof predetermined by the navigation system 100 for generating the area management profile 428.

As a more specific example, the infrastructure control module 712 can identify an area or a section of the navigation map 308 with heavy or dense traffic based on the smart vehicle data 222 from multiple vehicles. The infrastructure control module 712 can generate the area management profile 428 a vehicle approaching or within a threshold distance from the impeding source location 420 of FIG. 4 to provide notices or control signals to the scheduling authorities that can aid in rerouting, modifying, or communicate to vehicles on where there is less traffic.

The infrastructure control module 712 can further affect the context-relevant area 430 of FIG. 4 using the area management profile 428. For example, the infrastructure control module 712 can analyze the relevant vehicle area 310 and obtain information that an event will occur or is occurring. The new information can determine or provide an update route, modify schedule, trigger control, or a combination thereof to optimize traffic condition within that relevant vehicle area 310.

As a more specific example, the infrastructure control module 712 can analyze the relevant vehicle area 310 and track individual vehicles utilizing instances of the smart vehicle therein as a network. The infrastructure control module 712 can generate the area management profile 428 for notifying or for providing controls for one or more vehicles to increase flow rate, increase safety and avoid vehicle accidents, or a combination thereof. As a further specific example, the infrastructure control module 712 can generate the area management profile 428 for moving slower vehicles to travel on one side of the road, avoid collisions, dynamically adjust to real-time driving conditions, or a combination thereof.

The infrastructure control module 712 can provide similar functionalities of a traffic controller. The infrastructure control module 712 can generate routes, issue notifications, control vehicles, control traffic signals, control other peripheral schedules, such as for trains or bridge closures, or a combination thereof for generating the area management profile 428.

The infrastructure control module 712 can also manage the context-relevant area 430 by the context-relevant notice 432 of FIG. 4 and the routing adjustment 434 of FIG. 4. For example, the infrastructure control module 712 can provide an alert to the user 112 that the predetermined threshold for the area has a vehicle entering or is within the area. Consequently, if more vehicles reach this predetermined threshold state then that area becomes busy, provide more traffic, has slower traffic due to congestion, or a combination thereof.

The infrastructure control module 712 can further generate an adjustment to the schedule by the routing adjustment 434. For example, the routing adjustment 434 can provide suggestions or automatic detours to the current route profile to optimize the traffic condition or to avoid events that cause more delays to the schedule.

The infrastructure control module 712 can also generate an update to the area management profile 428 due to the traffic light schedule 436 of FIG. 4. For example, the infrastructure control module 712 due to the traffic light schedule 436 can provide details that traffic lights within an area of the navigation map 308 is busier during certain times of the day, indicating heavier traffic. The infrastructure control module 712 can further provide warning or notice about traffic conditions originating from the user, the vehicle, or a combination thereof to optimize traffic flow.

The infrastructure control module 712 can also utilize the road-external schedule 438 of FIG. 4 within the area management profile 428 to adjust an actual schedule. The infrastructure control module 712 can provide an adjustment due to the schedules that deal with train, boats, ships, bridges, bus, public transportation, or a combination thereof. For example, the infrastructure control module 712 can take into account a train or a public transportation schedule to optimize the overflow of traffic corresponding to the schedule or an indication that more traffic will occur due to the arrival or departure of the service.

The infrastructure control module 712 can direct and control multiple vehicles to manage traffic flow according to the area management profile 428 using one or more control circuits as discussed above. The infrastructure control module 712 can store the directions and instructions of managing traffic flow in one or more storage circuits as discussed above. The infrastructure control module 712 can further communicate or exchange various information between devices using one or more communications circuits as discussed above.

The infrastructure control module 712 can manage overall flow and coordinated movement of vehicles in a given area by generating the area management profile 428 using one or more control circuits discussed above, such as for the devices or the smart vehicle 202. The infrastructure control module 712 can communicate or exchange the area management profile 428 or a portion thereof between devices, vehicles, or a combination thereof using one or more of the communication circuits discussed above.

The infrastructure control module 712 can further store the area management profile 428 or a portion thereof in one or more of the storage circuits discussed above. The infrastructure control module 712 can further implement the area management profile 428 or a portion thereof at the intended target device or vehicle, such as for notifying the operator or controlling operation of the corresponding target, using one or more of the user interfaces or one or more of the control circuits discussed above.

After generating or providing adjustments to the actual schedule to optimize traffic flow, the control flow can pass from the infrastructure control module 712 back to the update module 704. The adjustment to the actual schedule can provide changes to navigation, direction, control, or a combination thereof to the vehicles therefore it can generate a change or affect to the update module 704.

It has been discovered that using the smart vehicle data 222 representing observations or measurements from the smart vehicle 202 to determine information about the unintelligent vehicle 224 provides increase safety and usability to the occupants of the unintelligent vehicle 224. The navigation system 100 can use the smart vehicle data 222 to observe and determine movement, behavior, surroundings, or a combination thereof for the unintelligent vehicle 224. The navigation system 100 can use the current driving profile 408 for the unintelligent vehicle 224 to provide features and warnings not originally available in the unintelligent vehicle 224.

It has also been discovered that using the smart vehicle data 222 identifying the smart vehicle 202, the unintelligent vehicle 224, the further vehicle, or a combination thereof provides awareness and navigation adjustments to provide safe passage for the approaching emergency vehicle. The navigation system 100 can use the smart vehicle data 222 to provide increase safety for other vehicles and establish a more efficient path to get to the emergency in a shorter amount of time.

It has further been discovered that smart vehicle data 222 can provide traffic awareness and conditions to a traffic control process or entity that will aid in traffic congestion. The navigation system 100 can use the area management profile 428 to provide notices, suggestions, and navigation adjustments to the scheduling authorities that help diffuse heavy traffic to help in traffic flow. The navigation system 100 can also utilize the context-relevant area 430, the traffic light schedule 436, and the road-external schedule 438 to provide direction, suggestions, and traffic condition for the smart vehicle 202, the unintelligent vehicle 224, or a combination thereof to facilitate and improve traffic flow.

The modules described in this application can be hardware implementation or hardware accelerators, including passive circuitry, active circuitry, or both, in the first storage circuit 514, the second storage circuit 546, the first control circuit 512, the second control circuit 534, or a combination thereof. The modules can also be hardware implementation or hardware accelerators, including passive circuitry, active circuitry, or both, within the first device 102, the second device 106, the third device 108, the fourth device 110, or a combination thereof but outside of the first storage circuit 514, the second storage circuit 546, the first control circuit 512, the second control circuit 534, or a combination thereof.

The navigation system 100 has been described with module functions or order as an example. The navigation system 100 can partition the modules differently or order the modules differently. For example, the navigation system 100 can be without the configuration module 706 with each device or vehicle therein uploading or communicating with other devices directly without the uploading designation 406. Also for example, the update module 704 and the vehicle mapping module 708 can be combined into one module.

For illustrative purposes, the various modules have been described as being specific to the first device 102, the second device 106, the third device 108, or the fourth device 110. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 514, the second storage circuit 546, or a combination thereof can represent the non-transitory computer readable medium. The first storage circuit 514, the second storage circuit 546, or a combination thereof, or a portion therein can be removable from the first device 102, the second device 106, the third device 108, the fourth device 110, or a combination thereof. Examples of the non-transitory computer readable medium can be a non-volatile memory card or stick, an external hard disk drive, a tape cassette, or an optical disk.

The physical transformation of the smart vehicle data 222 representing the real-world environment results in the real-time movement in the physical world, such as physical change in information or environment processed for the user on one or more of the devices or physical displacement of the first device 102 or the smart vehicle 202 . The smart vehicle data 222 can be utilized to provide information to the unintelligent vehicle 224 or an operator thereof using the current driving profile 408, manage overall traffic for a specific area with the area management profile 428, or a combination thereof as discussed above. The operators or autonomous vehicles can respond to the results of processing the smart vehicle data 222 to create physical movements. Movement in the physical world results in updates to the third device 108, the unintelligent vehicle, or a combination thereof, which can be fed back into the navigation system 100 and further influence or update the first device 102, the smart vehicle, or a combination thereof.

Figure 8:
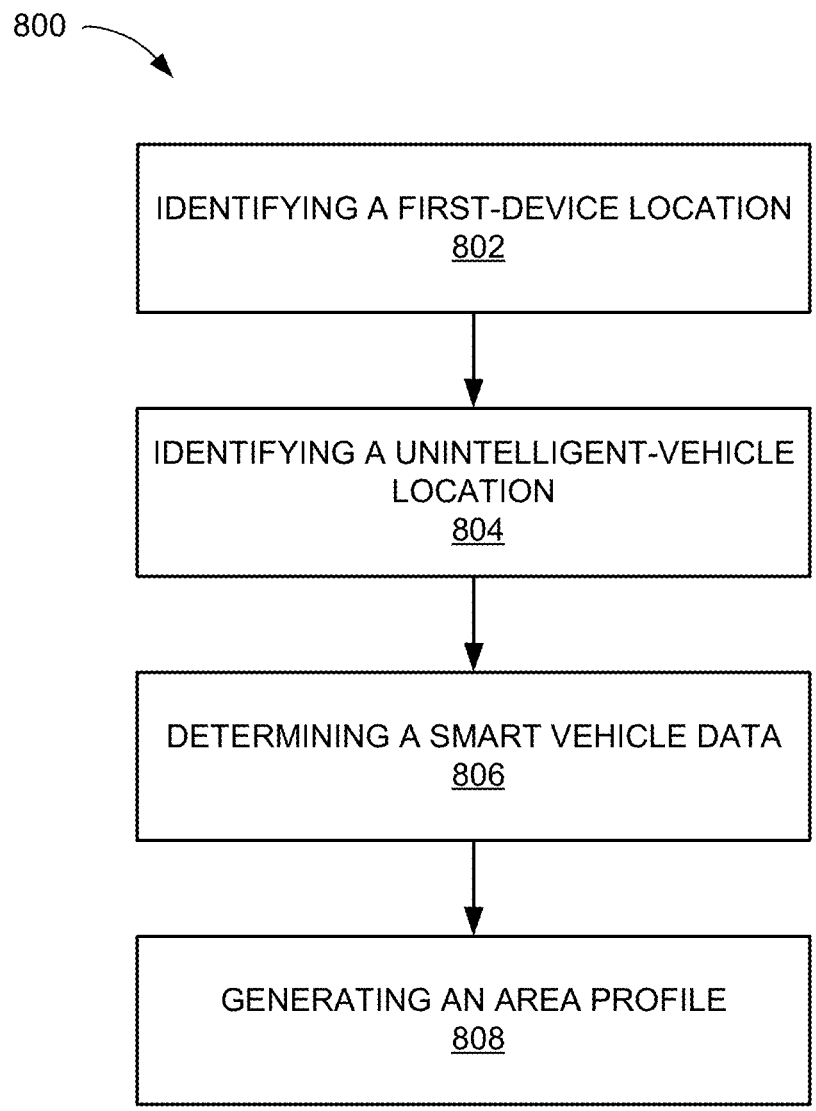
FIG. 8 is a flow chart of a method of operation of a navigation system in an embodiment of the present invention.

Referring now to FIG. 8, therein is shown a flow chart of a method 800 of operation of a navigation system 100 in an embodiment of the present invention. The method 800 includes: identifying a first-device location for representing a smart vehicle in a box 802; identifying a unintelligent-vehicle location associated with the first device location, the unintelligent-vehicle location for representing an unintelligent vehicle in a box 804; determining a smart vehicle data for representing the smart vehicle data from an environmental sensor of the smart vehicle in a box 806; and generating with a control circuit an area profile for the unintelligent-vehicle location based on the smart vehicle data for representing geographic relationship between the unintelligent vehicle and the smart vehicle, a further vehicle, or a combination thereof in a box 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a navigation system comprising:
   identifying, with a location module, a first-device location for representing a smart vehicle;
   identifying, with the location module, an unintelligent-vehicle location associated with the first-device location, the unintelligent-vehicle location for representing an unintelligent vehicle;
   determining, with an update module, a smart vehicle data for representing the smart vehicle data from an environmental sensors of the smart vehicle;
   generating with a vehicle control circuit an area profile for the unintelligent-vehicle location based on the smart vehicle data for representing geographic relationship between the unintelligent vehicle and the smart vehicle, a further vehicle, or a combination thereof;
   generating an area management profile for collectively controlling the smart vehicle, the unintelligent vehicle, the further vehicle, or a combination thereof to optimize a traffic condition corresponding to the area profile by providing notices or control signals to scheduling authorities to reroute or modify vehicle routes of the smart vehicle, the unintelligent vehicle, the further vehicle, or a combination thereof.

2. The method as claimed in claim 1 wherein:
   identifying the first-device location includes receiving the first-device location at a second device;
   identifying the unintelligent-vehicle location includes determining the unintelligent-vehicle location with the second device;
   determining the smart vehicle data includes receiving the smart vehicle data at the second device; and
   further comprising:
   generating a current driving profile based on the area profile for controlling the unintelligent vehicle according to the current driving profile sent from the second device to a fourth device associated with the unintelligent vehicle.

3. The method as claimed in claim 1 wherein:
   identifying the first-device location includes calculating the first-device location with a first device;
   identifying the unintelligent-vehicle location includes determining the unintelligent-vehicle location with the first device; and
   further comprising:
   generating a current driving profile based on the area profile for controlling the unintelligent vehicle according to the current driving profile sent from the first device to a fourth device associated with the unintelligent vehicle.

4. The method as claimed in claim 1 further comprising:
   identifying a fourth-device location for representing the further vehicle;
   generating a current driving profile based on the smart vehicle data and the fourth-device location for controlling the unintelligent vehicle in response to the further vehicle observed by the smart vehicle; and wherein:
   determining the smart vehicle data includes determining the smart vehicle data for representing the further vehicle sensed by the smart vehicle.

5. The method as claimed in claim 1 further comprising generating an area management profile based on calculating a specific maneuver including a turn, a lane change, a route, a travel speed or acceleration, or a combination thereof for each of the vehicles in a given area.

6. The method as claimed in claim 1 wherein generating the area profile includes:
   determining a relevant vehicle area based on the first-device location, the unintelligent-vehicle location, or a combination thereof; and
   generating the area profile including a lane-level relationship for representing the geographic relationship the unintelligent vehicle, the smart vehicle, the further vehicle, or a combination thereof according to one or more traffic lanes.

7. The method as claimed in claim 6 further comprising generating a current driving profile including an adjacent lane status, a proximity status, a sudden stop status, an emergency-vehicle notice, an accessory control, or a combination thereof based on the smart vehicle data for controlling the smart vehicle, the unintelligent vehicle, the further vehicle, or a combination thereof.

8. The method as claimed in claim 6 further comprising determining an uploading designation for managing the smart vehicle data from multiple vehicles within a portion of a navigation map.

9. The method as claimed in claim 6 further comprising generating an area management profile including a context-relevant notice or a routing adjustment for the further vehicle corresponding to a portion of the navigation map corresponding to the area profile, a traffic light schedule, a road-external schedule, or a combination thereof for collectively controlling the smart vehicle, the unintelligent vehicle, the further vehicle, or a combination thereof to optimize a traffic condition corresponding to the area profile.

10. The method as claimed in claim 6 wherein:
    determining the relevant vehicle area includes determining the relevant vehicle area based on the first-device location for identifying a portion of a navigation map including the smart vehicle; and
    further comprising:
    determining a device profile based on the smart vehicle data corresponding to the unintelligent-vehicle location for identifying the unintelligent vehicle located at the unintelligent-vehicle location within the relevant vehicle area; and
    generating a current driving profile based on the device profile and the lane-level relationship the current driving profile for the controlling the unintelligent vehicle based on the smart vehicle data processed according to the lane-level relationship between the smart vehicle and the unintelligent vehicle.

11. A navigation system comprising:
    a control circuit configured to:
    identify a first-device location for representing a smart vehicle;
    identifying an unintelligent-vehicle location associated with the first-device location, the unintelligent-vehicle location for representing an unintelligent vehicle;
    determining a smart vehicle data for representing the smart vehicle data from an environmental sensors of the smart vehicle;

generating an area profile for the unintelligent-vehicle location based on the smart vehicle data for representing geographic relationship between the unintelligent vehicle and the smart vehicle, a further vehicle, or a combination thereof;

generating an area management profile for collectively controlling the smart vehicle, the unintelligent vehicle, the further vehicle, or a combination thereof to notices or control signals to scheduling authorities to reroute or modify vehicle routes of the smart vehicle, the unintelligent vehicle, the further vehicle, or a combination thereof; and a storage circuit, coupled to the control circuit, configured to store the area profile.

12. The system as claimed in claim 11 wherein the control circuit is configured to:
   identify the first-device location based on receiving the first-device location at a second device;
   identify the unintelligent-vehicle location based on determining the unintelligent-vehicle location with the second device;
   determine the smart vehicle data based on receiving the smart vehicle data at the second device; and
   generate a current driving profile based on the area profile for controlling the unintelligent vehicle according to the current driving profile sent from the second device to a fourth device associated with the unintelligent vehicle.

13. The system as claimed in claim 11 wherein the control circuit is configured to:
   identify the first-device location based on calculating the first-device location with a first device;
   identify the unintelligent-vehicle location based on determining the unintelligent-vehicle location with the first device; and
   generate a current driving profile based on the area profile for controlling the unintelligent vehicle according to the current driving profile sent from the first device to a fourth device associated with the unintelligent vehicle.

14. The system as claimed in claim 11 wherein the control circuit is configured to:
   identify a fourth-device location for representing the further vehicle;
   generate a current driving profile based on the smart vehicle data and the fourth-device location for controlling the unintelligent vehicle in response to the further vehicle observed by the smart vehicle; and
   determine the smart vehicle data for representing the further vehicle sensed by the smart vehicle.

15. The system as claimed in claim 11 wherein the control circuit is configured to generate an area management profile based on calculating a specific maneuver including a turn, a lane change, a route, a travel speed or acceleration, or a combination thereof for each of the vehicles in a given area.

16. A non-transitory computer readable medium including instructions for a navigation system comprising:
   identifying a first-device location for representing a smart vehicle;
   identifying an unintelligent-vehicle location associated with the first-device location, the unintelligent-vehicle location for representing an unintelligent vehicle;
   determining a smart vehicle data for representing the smart vehicle data from an environmental sensors of the smart vehicle;
   generating an area profile for the unintelligent-vehicle location based on the smart vehicle data for representing geographic relationship between the unintelligent vehicle and the smart vehicle, a further vehicle, or a combination thereof; and
   generating an area management profile for collectively controlling the smart vehicle, the unintelligent vehicle, the further vehicle, or a combination thereof to optimize a traffic condition corresponding to the area profile by providing notices or control signals to scheduling authorities to reroute or modify vehicle routes of the smart vehicle, the unintelligent vehicle, the further vehicle, or a combination thereof.

17. The non-transitory computer readable medium including the instructions as claimed in claim 16 wherein:
   identifying the first-device location includes receiving the first-device location at a second device;
   identifying the unintelligent-vehicle location includes determining the unintelligent-vehicle location with the second device;
   determining the smart vehicle data includes receiving the smart vehicle data at the second device; and
further comprising:
   generating a current driving profile based on the area profile for controlling the unintelligent vehicle according to the current driving profile sent from the second device to a fourth device associated with the unintelligent vehicle.

18. The non-transitory computer readable medium including the instructions as claimed in claim 16 wherein:
   identifying the first-device location includes calculating the first-device location with a first device;
   identifying the unintelligent-vehicle location includes determining the unintelligent-vehicle location with the first device; and
further comprising:
   generating a current driving profile based on the area profile for controlling the unintelligent vehicle according to the current driving profile sent from the first device to a fourth device associated with the unintelligent vehicle.

19. The non-transitory computer readable medium including the instructions as claimed in claim 16 further comprising:
   identifying a fourth-device location for representing the further vehicle;
   generating a current driving profile based on the smart vehicle data and the fourth-device location for controlling the unintelligent vehicle in response to the further vehicle observed by the smart vehicle; and
wherein:
   determining the smart vehicle data includes determining the smart vehicle data for representing the further vehicle sensed by the smart vehicle.

20. The non-transitory computer readable medium including the instructions as claimed in claim 16 further comprising generating an area management profile based on calculating a specific maneuver including a turn, a lane change, a route, a travel speed or acceleration, or a combination thereof for each of the vehicles in a given area.

* * * * *